US012142183B2

(12) United States Patent
Sung et al.

(10) Patent No.: US 12,142,183 B2
(45) Date of Patent: Nov. 12, 2024

(54) DISPLAY PANEL AND METHOD OF MEASURING LIFE TIME OF THE SAME

(71) Applicant: Samsung Display Co., Ltd., Yongin-Si (KR)

(72) Inventors: Si Jin Sung, Yongin-si (KR); Ill Soo Park, Yongin-si (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/224,572

(22) Filed: Jul. 21, 2023

(65) Prior Publication Data

US 2024/0038126 A1 Feb. 1, 2024

(30) Foreign Application Priority Data

Jul. 29, 2022 (KR) ........................ 10-2022-0094923

(51) Int. Cl.
*G09G 3/20* (2006.01)
*G09G 3/3291* (2016.01)

(52) U.S. Cl.
CPC ......... *G09G 3/2074* (2013.01); *G09G 3/2003* (2013.01); *G09G 3/3291* (2013.01); *G09G 2300/0452* (2013.01)

(58) Field of Classification Search
CPC ... G09G 2300/0452; G09G 2300/0819; G09G 2300/0842; G09G 2300/0861; G09G 2310/0251; G09G 2310/0262; G09G 2320/0242; G09G 2320/0686; G09G 3/2003; G09G 3/2074; G09G 3/3233; G09G 3/3291
See application file for complete search history.

(56) References Cited

U.S. PATENT DOCUMENTS

| | | | | |
|---|---|---|---|---|
| 11,081,063 | B2 | 8/2021 | Cho et al. | |
| 11,170,703 | B2 | 11/2021 | Lee et al. | |
| 2019/0204672 | A1* | 7/2019 | Choi | G02F 1/133603 |
| 2019/0304378 | A1* | 10/2019 | Cho | H10K 59/131 |
| 2021/0210000 | A1* | 7/2021 | Lee | G09G 3/32 |

FOREIGN PATENT DOCUMENTS

| | | | | |
|---|---|---|---|---|
| CN | 114217895 | A * | 3/2022 | G06F 9/451 |
| KR | 10-2019-0116600 | A | 10/2019 | |
| KR | 10-2051640 | B1 | 12/2019 | |
| KR | 10-2021-0089819 | A | 7/2021 | |
| KR | 10-2410761 | B1 | 6/2022 | |

* cited by examiner

*Primary Examiner* — Kenneth Bukowski

(74) *Attorney, Agent, or Firm* — Innovation Counsel LLP

(57) ABSTRACT

In a method of measuring a life time of a display panel, pixels each including a first sub-pixel emitting light of a first color are disposed in the display panel. The display panel includes a first region in which at least one pixel including a first sub-pixel emitting light of the first color is located and a second region not overlapping with the first region and having at least one pixel located therein. The method includes a first step in which a first sub-pixel in the first region emits light and a first sub-pixel in the second region does not emit light while the first sub-pixel emits light, and a second step in which a data voltage for displaying an image of the same grayscale is applied to the first sub-pixel located in the first region and the first sub-pixel located in the second region.

20 Claims, 14 Drawing Sheets

<ESTIMATING LIFE TIME OF RED SUBPIXEL>

| | STEP 1 | | STEP 2 | | ESTIMATED LIFE TIME |
|---|---|---|---|---|---|
| COMBINATION | REGION 1 | REGION 2 | REGION 1 | REGION 2 | |
| CASE 1 | WHITE | CYAN | RED | RED | MEDIUM |
| CASE 2 | WHITE | BLACK | RED | RED | LONG |
| CASE 3 | RED | CYAN | RED | RED | SHORT |
| CASE 4 | RED | BLACK | RED | RED | MEDIUM |

<ESTIMATING LIFE TIME OF GREEN SUBPIXEL>

| | STEP 1 | | STEP 2 | | ESTIMATED LIFE TIME |
|---|---|---|---|---|---|
| COMBINATION | REGION 1 | REGION 2 | REGION 1 | REGION 2 | |
| CASE 1 | WHITE | MAGENTA | GREEN | GREEN | MEDIUM |
| CASE 2 | WHITE | BLACK | GREEN | GREEN | LONG |
| CASE 3 | GREEN | MAGENTA | GREEN | GREEN | SHORT |
| CASE 4 | GREEN | BLACK | GREEN | GREEN | MEDIUM |

<ESTIMATING LIFE TIME OF BLUE SUBPIXEL>

| COMBINATION | STEP 1 REGION 1 | STEP 1 REGION 2 | STEP 2 REGION 1 | STEP 2 REGION 2 | ESTIMATED LIFE TIME |
|---|---|---|---|---|---|
| CASE 1 | WHITE | YELLOW | BLUE | BLUE | MEDIUM |
| CASE 2 | WHITE | BLACK | BLUE | BLUE | LONG |
| CASE 3 | BLUE | YELLOW | BLUE | BLUE | SHORT |
| CASE 4 | BLUE | BLACK | BLUE | BLUE | MEDIUM |

FIG. 12

<ESTIMATING LIFE TIME OF RED SUBPIXEL>

| | STEP 1 | | STEP 2 | | ESTIMATED LIFE TIME |
|---|---|---|---|---|---|
| COMBINATION | REGION 1 | REGION 2 | REGION 1 | REGION 2 | |
| CASE 1 | WHITE | CYAN | RED | RED | MEDIUM |
| CASE 2 | WHITE | BLACK | RED | RED | LONG |
| CASE 3 | RED | CYAN | RED | RED | SHORT |
| CASE 4 | RED | BLACK | RED | RED | MEDIUM |

⇩

| | STEP 1 | | STEP 2-1 | | ESTIMATED LIFE TIME |
|---|---|---|---|---|---|
| COMBINATION | REGION 1 | REGION 2 | REGION 1 | REGION 2 | |
| CASE 1 | REGION 1-1(WHITE) | REGION 2-2(CYAN) | REGION 1-1(RED) | REGION 2-2(RED) | MEDIUM |
| CASE 2 | REGION 1-1(WHITE) | REGION 2-1(BLACK) | REGION 1-1(RED) | REGION 2-1(RED) | LONG |
| CASE 3 | REGION 1-2(RED) | REGION 2-2(CYAN) | REGION 1-2(RED) | REGION 2-2(RED) | SHORT |
| CASE 4 | REGION 1-2(RED) | REGION 2-1(BLACK) | REGION 1-2(RED) | REGION 2-1(RED) | MEDIUM |

FIG. 13

<ESTIMATING LIFE TIME OF GREEN SUBPIXEL>

| | STEP 1 | | STEP 2 | | ESTIMATED LIFE TIME |
|---|---|---|---|---|---|
| COMBINATION | REGION 1 | REGION 2 | REGION 1 | REGION 2 | |
| CASE 1 | WHITE | MAGENTA | GREEN | GREEN | MEDIUM |
| CASE 2 | WHITE | BLACK | GREEN | GREEN | LONG |
| CASE 3 | GREEN | MAGENTA | GREEN | GREEN | SHORT |
| CASE 4 | GREEN | BLACK | GREEN | GREEN | MEDIUM |

⇩

| | STEP 1 | | STEP 2-2 | | ESTIMATED LIFE TIME |
|---|---|---|---|---|---|
| COMBINATION | REGION 1 | REGION 2 | REGION 1 | REGION 2 | |
| CASE 1 | REGION 1-1(WHITE) | REGION 2-3(MAGENTA) | REGION 1-1(GREEN) | REGION 2-3(GREEN) | MEDIUM |
| CASE 2 | REGION 1-1(WHITE) | REGION 2-1(BLACK) | REGION 1-1(GREEN) | REGION 2-1(GREEN) | LONG |
| CASE 3 | REGION 1-3(GREEN) | REGION 2-3(MAGENTA) | REGION 1-3(GREEN) | REGION 2-3(GREEN) | SHORT |
| CASE 4 | REGION 1-3(GREEN) | REGION 2-1(BLACK) | REGION 1-3(GREEN) | REGION 2-1(GREEN) | MEDIUM |

FIG. 14

<ESTIMATING LIFE TIME OF BLUE SUBPIXEL>

| | STEP 1 | | STEP 2 | | ESTIMATED LIFE TIME |
|---|---|---|---|---|---|
| COMBINATION | REGION 1 | REGION 2 | REGION 1 | REGION 2 | |
| CASE 1 | WHITE | YELLOW | BLUE | BLUE | MEDIUM |
| CASE 2 | WHITE | BLACK | BLUE | BLUE | LONG |
| CASE 3 | BLUE | YELLOW | BLUE | BLUE | SHORT |
| CASE 4 | BLUE | BLACK | BLUE | BLUE | MEDIUM |

⇩

| | STEP 1 | | STEP 2-3 | | ESTIMATED LIFE TIME |
|---|---|---|---|---|---|
| COMBINATION | REGION 1 | REGION 2 | REGION 1 | REGION 2 | |
| CASE 1 | REGION 1-1(WHITE) | REGION 2-4(YELLOW) | REGION 1-1(BLUE) | REGION 2-4(BLUE) | MEDIUM |
| CASE 2 | REGION 1-1(WHITE) | REGION 2-1(BLACK) | REGION 1-1(BLUE) | REGION 2-1(BLUE) | LONG |
| CASE 3 | REGION 1-4(BLUE) | REGION 2-4(YELLOW) | REGION 1-4(BLUE) | REGION 2-4(BLUE) | SHORT |
| CASE 4 | REGION 1-4(BLUE) | REGION 2-1(BLACK) | REGION 1-4(BLUE) | REGION 2-1(BLUE) | MEDIUM |

DISPLAY PANEL AND METHOD OF MEASURING LIFE TIME OF THE SAME

CROSS-REFERENCE TO RELATED APPLICATION

The present application claims priority under 35 U.S.C. § 119(a) to Korean patent application No. 10-2022-0094923 filed on Jul. 29, 2022, in the Korean Intellectual Property Office, the entire disclosure of which is incorporated herein by reference.

BACKGROUND

1. Technical Field

The present disclosure generally relates to a display panel and a method of measuring a life time of the same.

2. Related Art

With the development of information technologies, the importance of a display device which is a connection medium between a user and information increases. Accordingly, display devices such as a liquid crystal display device and an organic light emitting display device are increasingly used.

When a display device is implemented as a self-luminous display device not including any component such as a backlight, the display device may include a light emitting layer configured to emit light. As light is continuously emitted from the light emitting layer, the light emission efficiency of the light emitting layer may be deteriorated. When the light emission efficiency of the light emitting layer is deteriorated, deterioration of luminance in a corresponding region may be viewed by a user of the display device.

In such a technical background, attempts for objectively identifying how much the luminance is deteriorated according to a use time of the display device have been continuously made.

SUMMARY

Embodiments provide a display panel and a method of measuring a life time of the display panel, which can objectively identify the light emission efficiency of the display device.

Embodiments also provide a display panel and a method of measuring a life time of the display panel, which can more objectively identify the light emission efficiency of the display device by considering a characteristic change of transistors constituting the display panel.

In accordance with an aspect of the present disclosure, there is provided a method of measuring a life time of a display panel, the display panel including a plurality of pixels each including a first sub-pixel emitting light of a first color, wherein the display panel includes a first region in which at least one pixel including the first sub-pixel emitting light of the first color is located and a second region not overlapping with the first region and having at least one pixel located therein, the method comprising: a first step in which a first sub-pixel of a pixel located in the first region emits light and a first sub-pixel of a pixel located in the second region does not emit light while the first sub-pixel located in the first region emits light; and a second step in which a data voltage for displaying an image of the same grayscale is applied to the first sub-pixel located in the first region and the first sub-pixel located in the second region.

Each of the plurality of pixels may further include: a second sub-pixel emitting light of a second color different from the first color; and a third sub-pixel emitting light of a third color different from the first color and the second color. The first region may include: a white color emission region in which the first sub-pixel, the second sub-pixel, the third sub-pixel emit light during the first step; a first color emission region in which the first sub-pixel emits light and the second sub-pixel and the third sub-pixel do not emit light during the first step; a second color emission region in which the second sub-pixel emits light and the first sub-pixel and the third sub-pixel do not emit light during the first step; and a third color emission region in which the third sub-pixel emits light and the first sub-pixel and the second sub-pixel do not emit light during th the first step.

The second region may include: a black grayscale display region in which the first sub-pixel, the second sub-pixel, and the third sub-pixel do not emit light during the first step; a complementary color emission region of a first color in which the first sub-pixel does not emit light and the second sub-pixel and the third sub-pixel emit light during the first step; a complementary color emission region of a second color in which the second sub-pixel does not emit light and the first sub-pixel and the second sub-pixel emit light during the first step; and a complementary color emission region of a third color in which the third sub-pixel does not emit light and the first sub-pixel and the second sub-pixel emit light during the first step.

The second step may include a $(2\text{-}1)^{th}$ step in which a data voltage for displaying an image of the same grayscale is applied to the first sub-pixel located in the white color emission region and the first sub-pixel located in the black grayscale display region.

The second step may include a $(2\text{-}2)^{th}$ step in which a data voltage for displaying an image of the same grayscale is applied to the second sub-pixel located in the white color emission region and the second sub-pixel located in the black grayscale display region.

The second step may include a $(2\text{-}3)^{th}$ step in which a data voltage for displaying an image of the same grayscale is applied to the third sub-pixel located in the white color emission region and the third sub-pixel located in the black grayscale display region.

In the second step, a data voltage for displaying an image of the same grayscale may be applied to a first sub-pixel located in the first color emission region and a first sub-pixel located in the complementary color emission region of the first color.

In the second step, a data voltage for displaying an image of the same grayscale may be applied to a second sub-pixel located in the second color emission region and a second sub-pixel located in the complementary color emission region of the second color.

In the second step, a data voltage for displaying an image of the same grayscale may be applied to a third sub-pixel located in the third color emission region and a third sub-pixel located in the complementary color emission region of the third color.

Each of the first sub-pixel, the second sub-pixel, and the third sub-pixel may include: a light emitting element; a first transistor configured to drive the light emitting element; a second transistor controlled by a first scan signal, the second transistor being configured to transfer the data voltage to the first transistor; and a third transistor controlled by a second scan signal, the third transistor being configured to switch electrical connection between a drain node and a gate node of the first transistor.

During a period of the first step, a threshold voltage of the third transistor located in the white color emission region may be negative-shifted, and a threshold voltage of the third transistor located in the black grayscale display region may be negative-shifted.

A degree to which the threshold voltage of the third transistor located in the white color emission area is negative-shifted may be greater than a degree to which the threshold voltage of the third transistor located in the black grayscale display area.

A substrate on which the first transistor, the second transistor, and the third transistor are formed may be a polyimide substrate.

The display panel may include an organic light emitting layer.

The data voltage for displaying the image of the same grayscale applied to a first sub-pixel located in the first region and a first sub-pixel located in the second region in the second step may be a data voltage for displaying a red image of grayscale 255, a data voltage for displaying a green image of grayscale 255, or a data voltage for displaying a blue image of grayscale 255.

In accordance with another aspect of the present disclosure, there is provided a display panel including: a substrate; a plurality of data lines located on the substrate, the plurality of data lines supplying data voltages for image display; a plurality of scan lines located on the substrate, the plurality of scan lines supplying scan signals; and a plurality of pixels located in a region in which the plurality of data lines and the plurality of scan lines intersect each other, the plurality of pixels disposed in predetermined regions receiving a predetermined data voltage during an aging process, wherein at least one pixel including a first sub-pixel emitting light of a first color is located in each of the predetermined regions, wherein, during a first step in the aging process, a data voltage for displaying an image of a grayscale greater than grayscale 0 is applied to a first sub-pixel located in a first region among the predetermined regions, and a data voltage for displaying an image of the grayscale 0 is applied to a first sub-pixel located in a second region different from the first region, and wherein, during a second step in the aging process, a data voltage for displaying an image of the same grayscale is applied to the first sub-pixel located in the first region and the first sub-pixel located in the second region.

Each of the plurality of pixels may include: the first sub-pixel emitting light of the first color; a second sub-pixel emitting light of a second color different from the first color; and a third sub-pixel emitting light of a third color different from the first color and the second color. The first region may include: a white color emission region in which the first sub-pixel, the second sub-pixel, and the third sub-pixel emit light during the first step; a first color emission region in which the first sub-pixel emits light and the second sub-pixel and the third sub-pixel do not emit light during the first step; a second color emission region in which the second sub-pixel emits light and the first sub-pixel and the third sub-pixel do not emit light during the first step; and a third color emission region in which the third sub-pixel emits light and the first sub-pixel and the second sub-pixel do not emit light during the first step.

The second region may include: a low grayscale image display region in which a data voltage for displaying an image of a low grayscale level equal to or lower than a predetermined grayscale level is applied to the first sub-pixel, the second sub-pixel, and the third sub-pixel during the first step; a complementary color emission region of a first color in which the first sub-pixel does not emit light and the second sub-pixel and the third sub-pixel emit light during the first step; a complementary color emission region of a second color in which the second sub-pixel does not emit light and the first sub-pixel and the third sub-pixel emit light during the first step; and a complementary color emission region of a third color in which the third sub-pixel does not emit light and the first sub-pixel and the second sub-pixel emit light during the first step.

Each of the first sub-pixel, the second sub-pixel, and the third sub-pixel may include: a light emitting element; a first transistor configured to drive the light emitting element; a second transistor controlled by a first scan signal, the second transistor being configured to switch electrical connection between any one data line among the plurality of data lines and the first transistor; and a third transistor controlled by a second scan signal, the third transistor being configured to switch electrical connection between a drain node and a gate node of the first transistor.

Each of the plurality of pixels may include a light emitting element, and the light emitting element may include an organic light emitting layer.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein.

Rather, these embodiments are provided so that this disclosure will be thorough and complete, and will fully convey the scope of the example embodiments to those skilled in the art.

Figure 1:
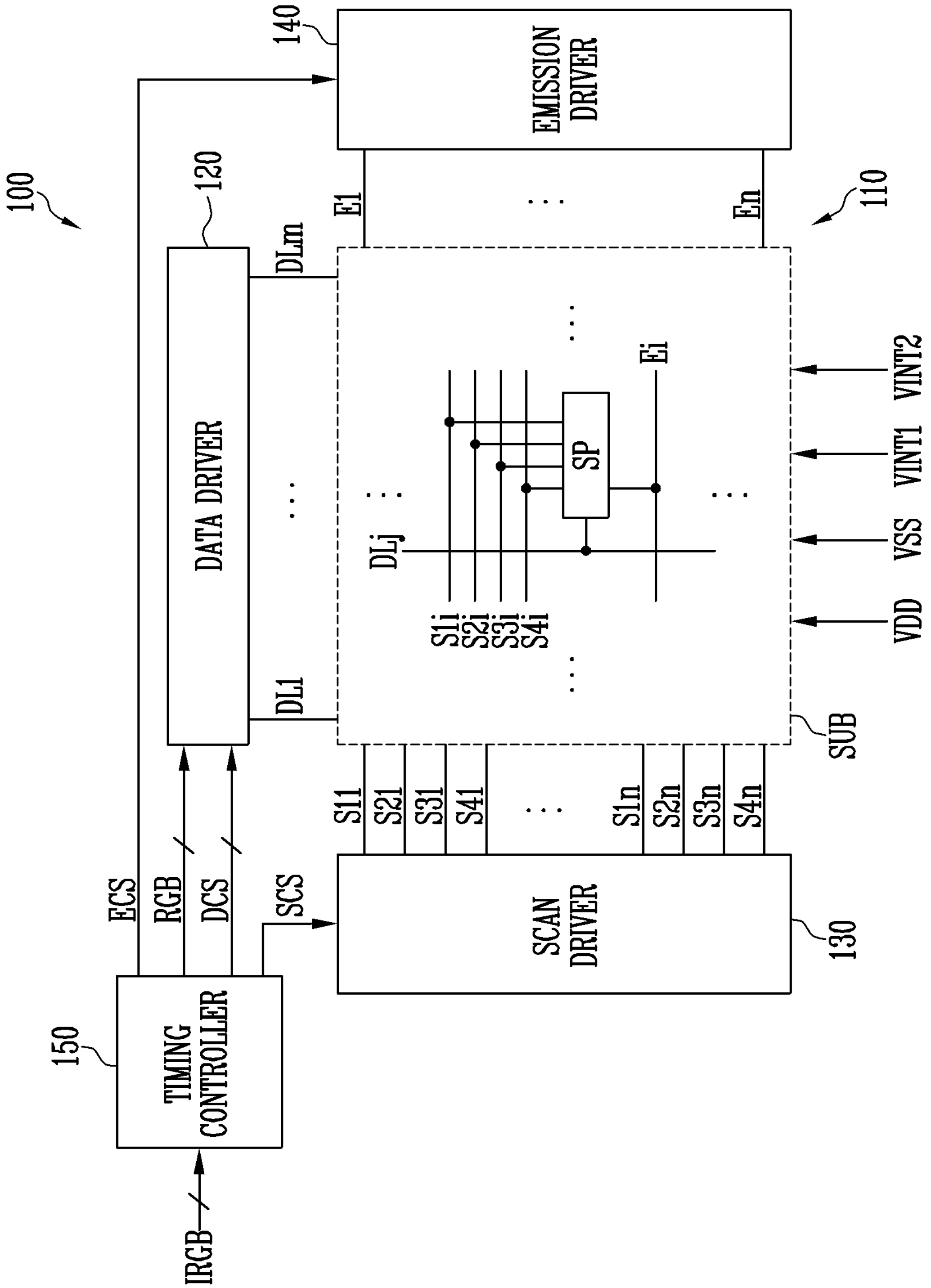

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a system block diagram of a display device in accordance with embodiments of the present disclosure.

Figure 2:
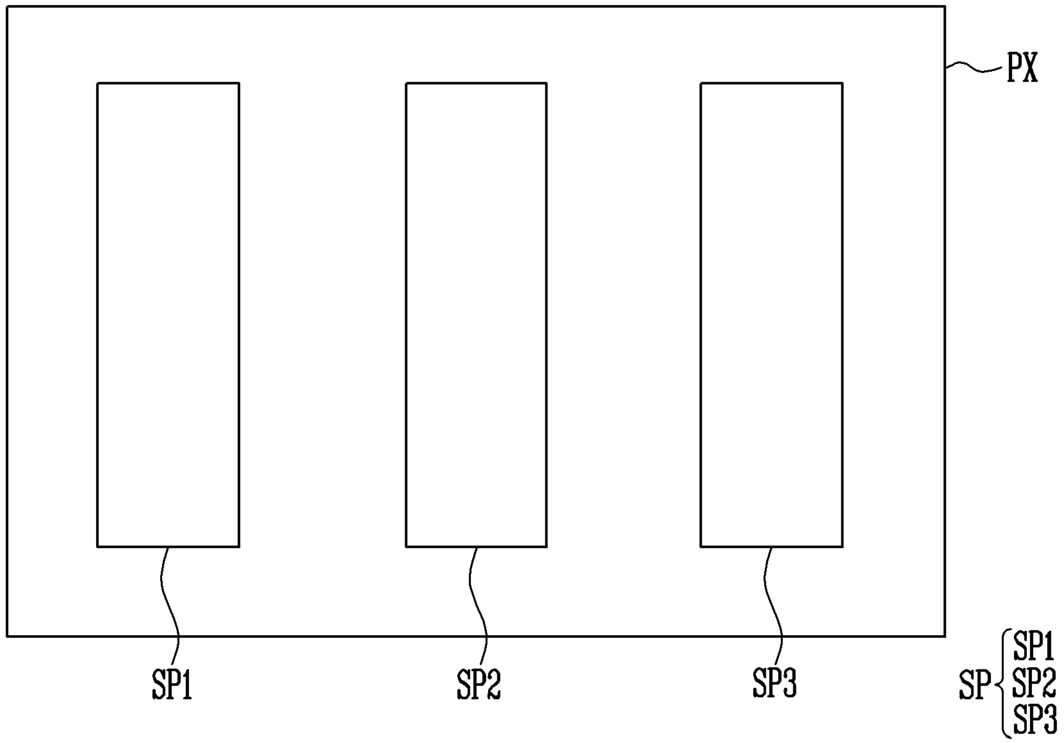

FIG. 2 is a diagram illustrating a pixel in accordance with embodiments of the present disclosure.

Figure 3:
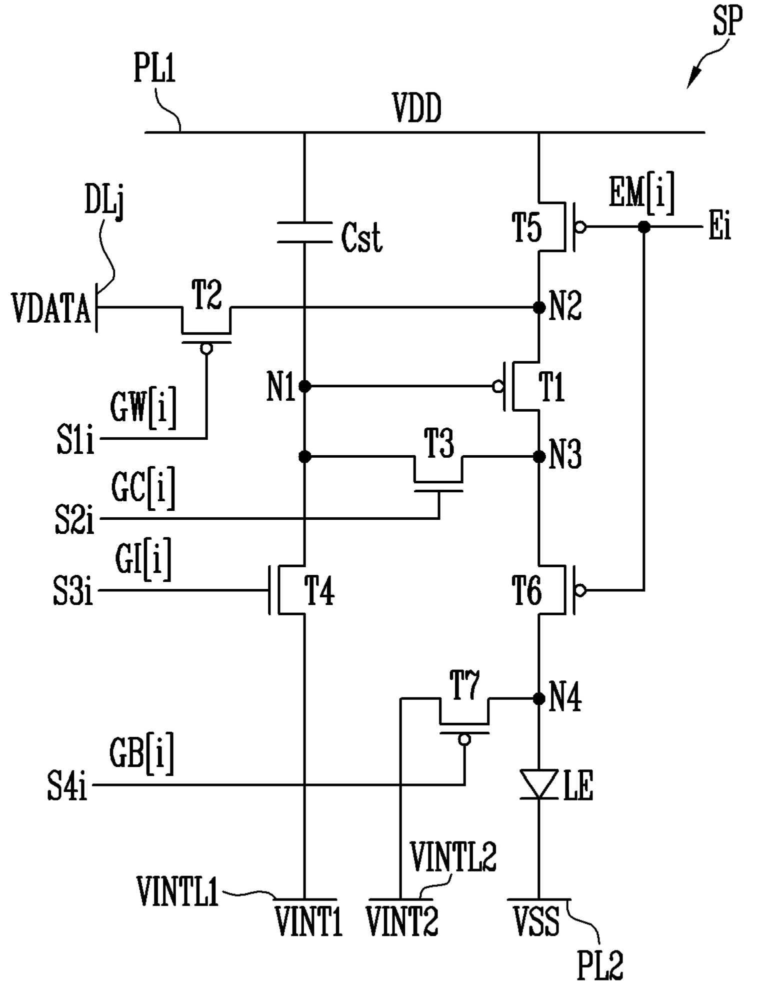

FIG. 3 is a circuit diagram exemplarily illustrating a sub-pixel in accordance with embodiments of the present disclosure.

Figure 4:
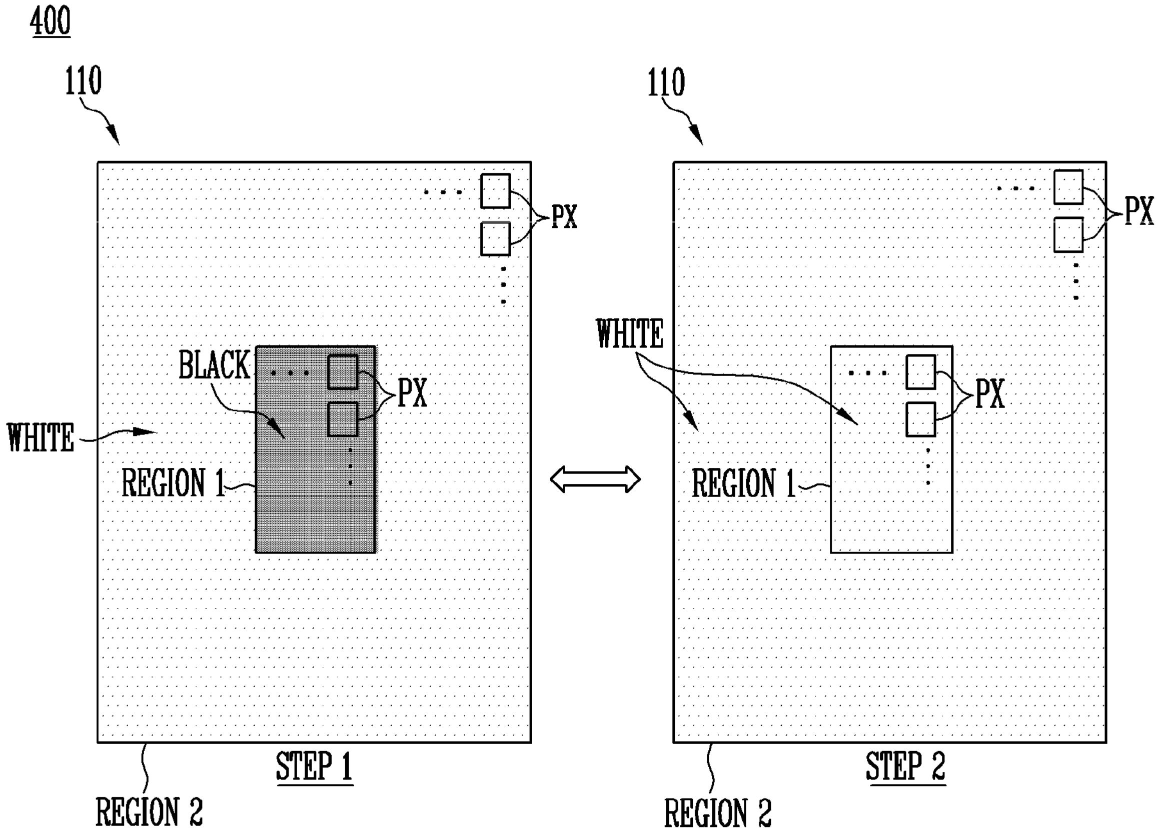

FIG. 4 illustrates an example of a method of measuring a life time of a display panel in accordance with embodiments of the present disclosure.

Figure 5:
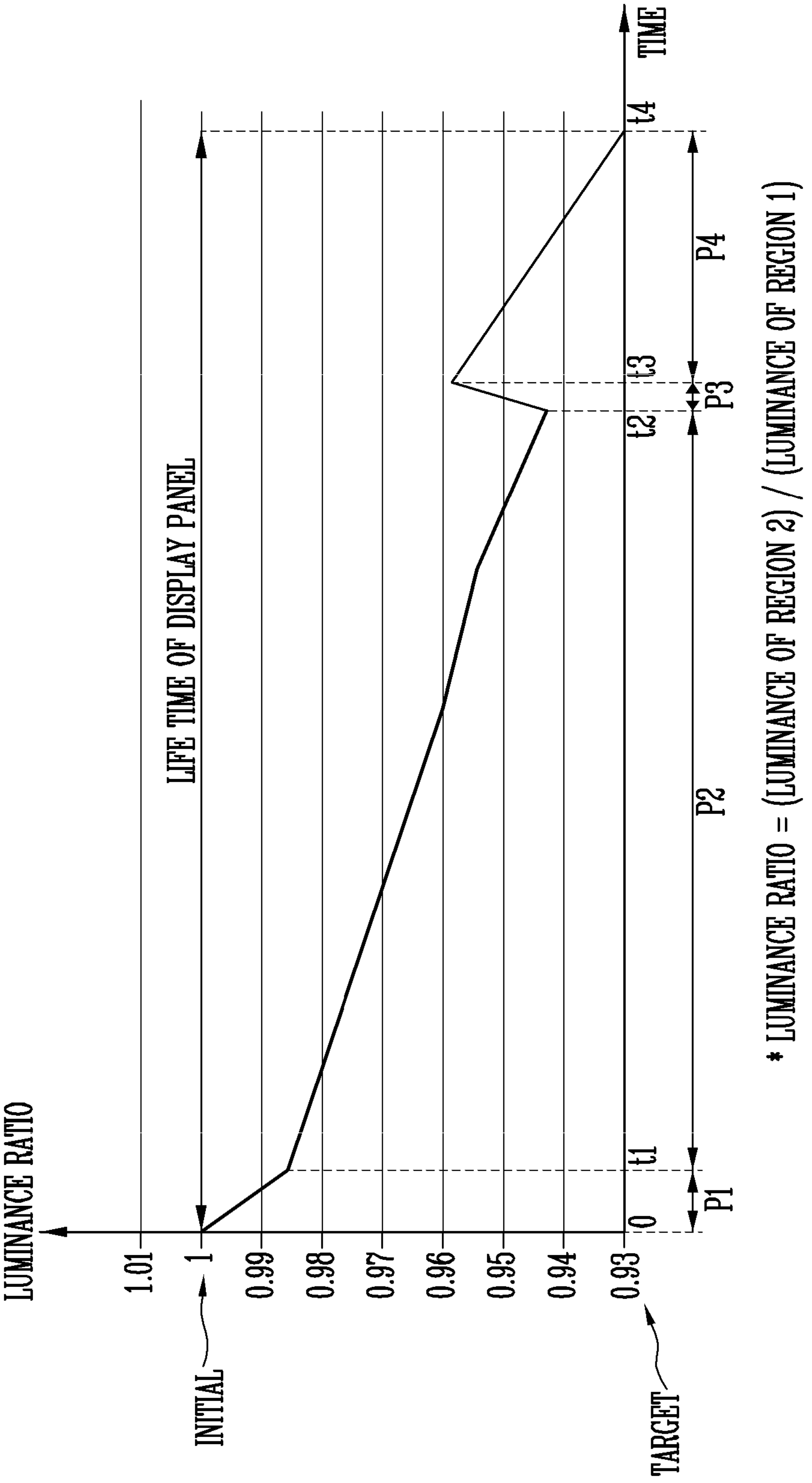

FIG. 5 is a luminance change graph of the display panel, which is measured according to the method shown in FIG. 4.

Figure 6:
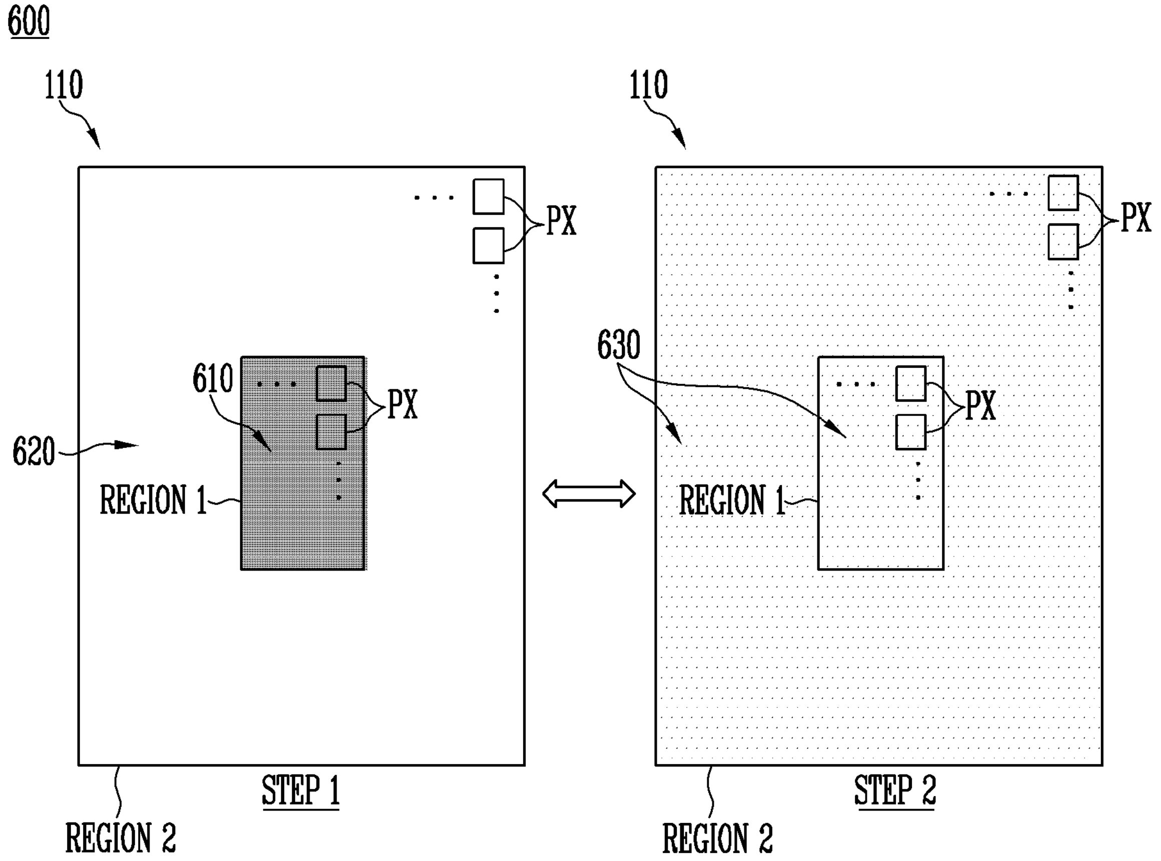

FIG. 6 illustrates another example of the method of measuring the life time of the display panel in accordance with the embodiments of the present disclosure.

Figures 7A, 7B:
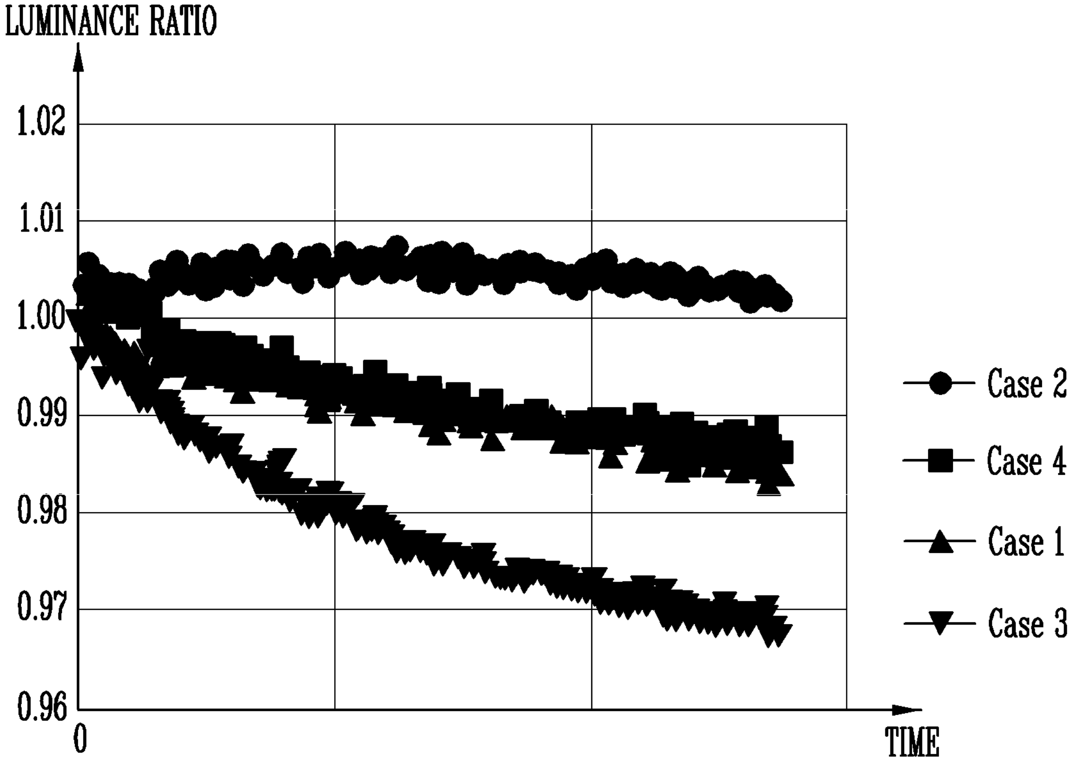

FIG. 7A is a table illustrating a life time of a red sub-pixel in accordance with the embodiment shown in FIG. 6 in a plurality of combinations.

FIG. 7B is a life time graph of the red sub-pixel for each combination shown in FIG. 7A.

Figures 8A, 8B:
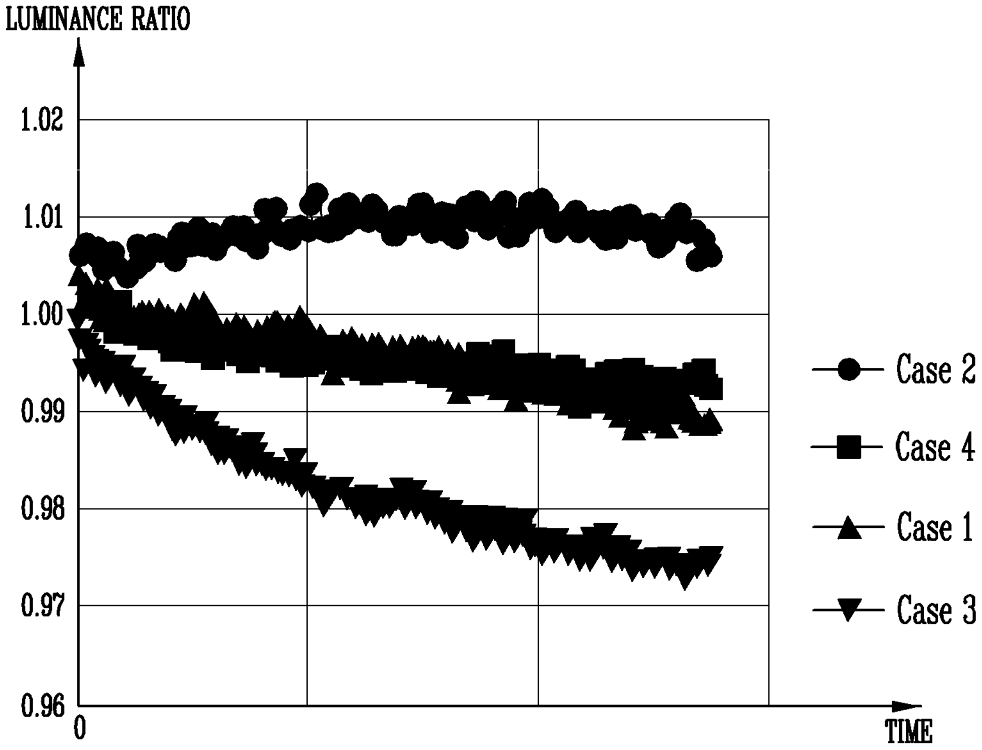

FIG. 8A is a table illustrating a life time of a green sub-pixel in accordance with the embodiment shown in FIG. 6 in a plurality of combinations.

FIG. 8B is a life time graph of the green sub-pixel for each combination shown in FIG. 8A.

Figures 9A, 9B:
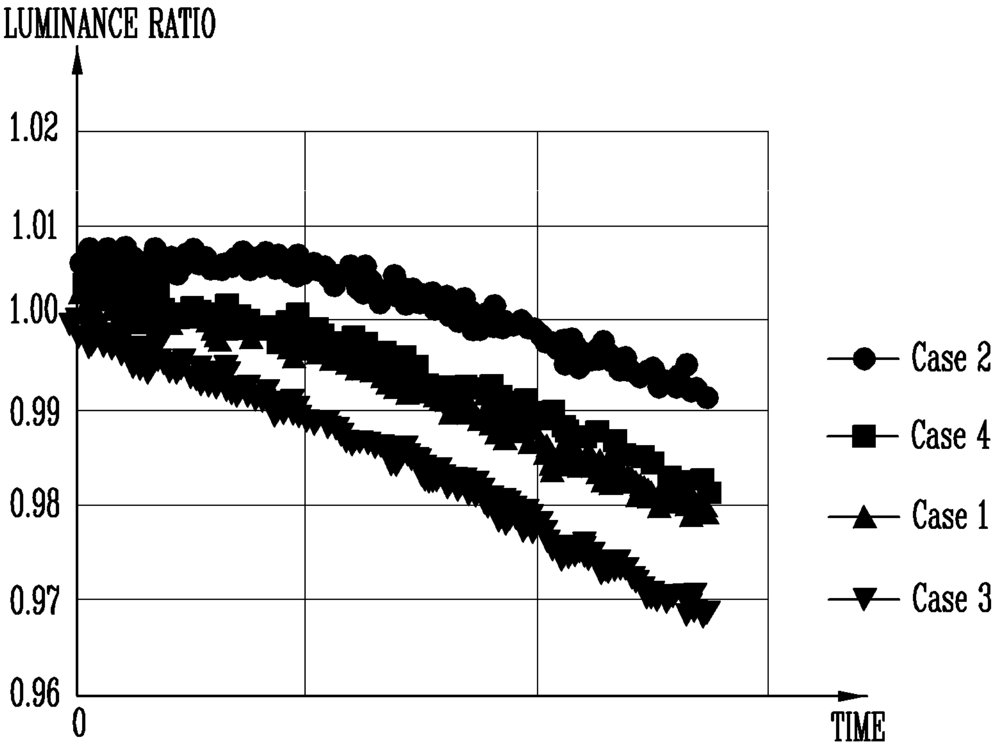

FIG. 9A is a table illustrating a life time of a blue sub-pixel in accordance with the embodiment shown in FIG. 6 in a plurality of combinations.

FIG. 9B is a life time graph of the blue sub-pixel for each combination shown in FIG. 9A.

Figure 10:
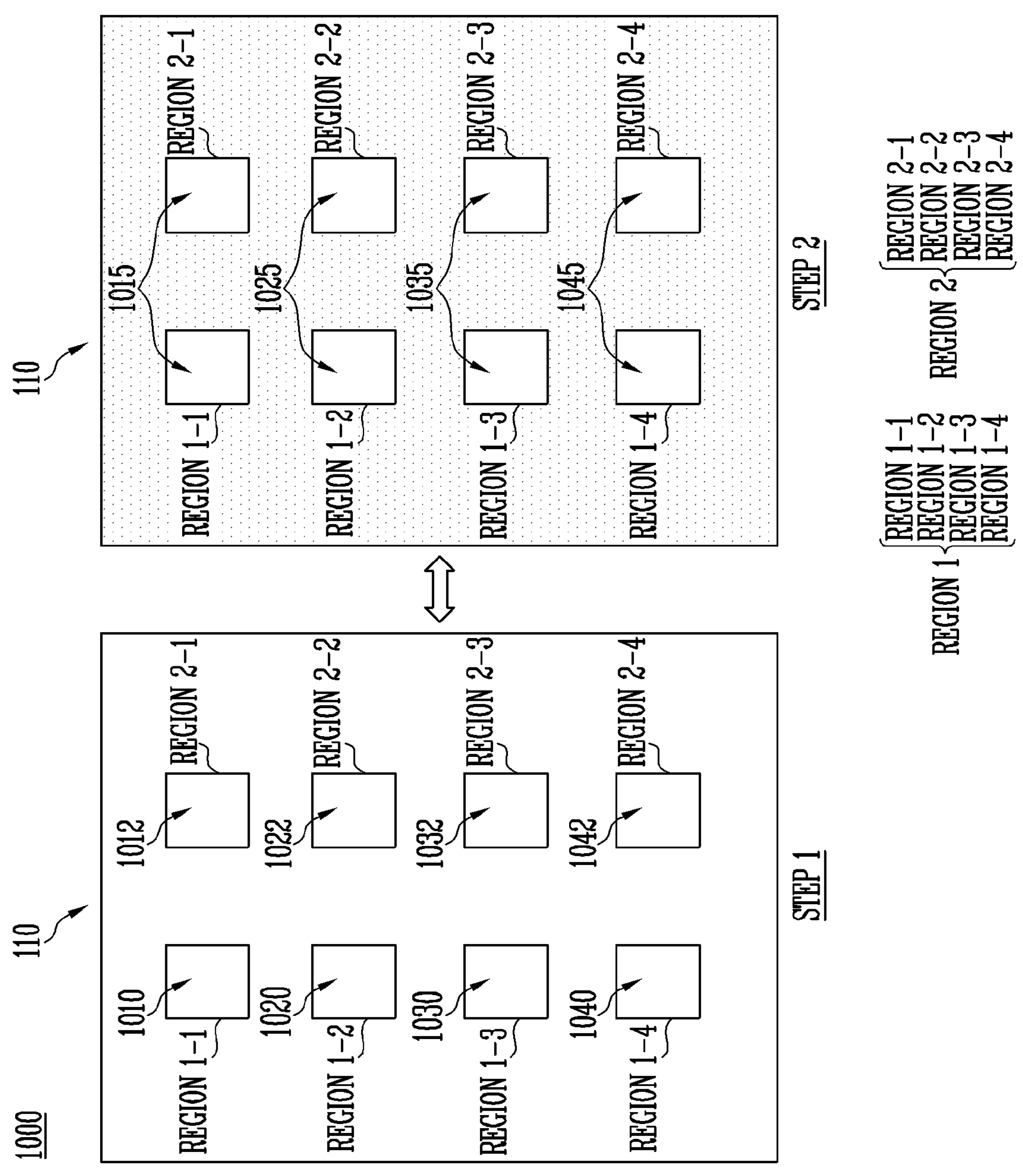

FIG. 10 illustrates still another example of the method of measuring the life time of the display panel in accordance with the embodiments of the present disclosure.

Figure 11:
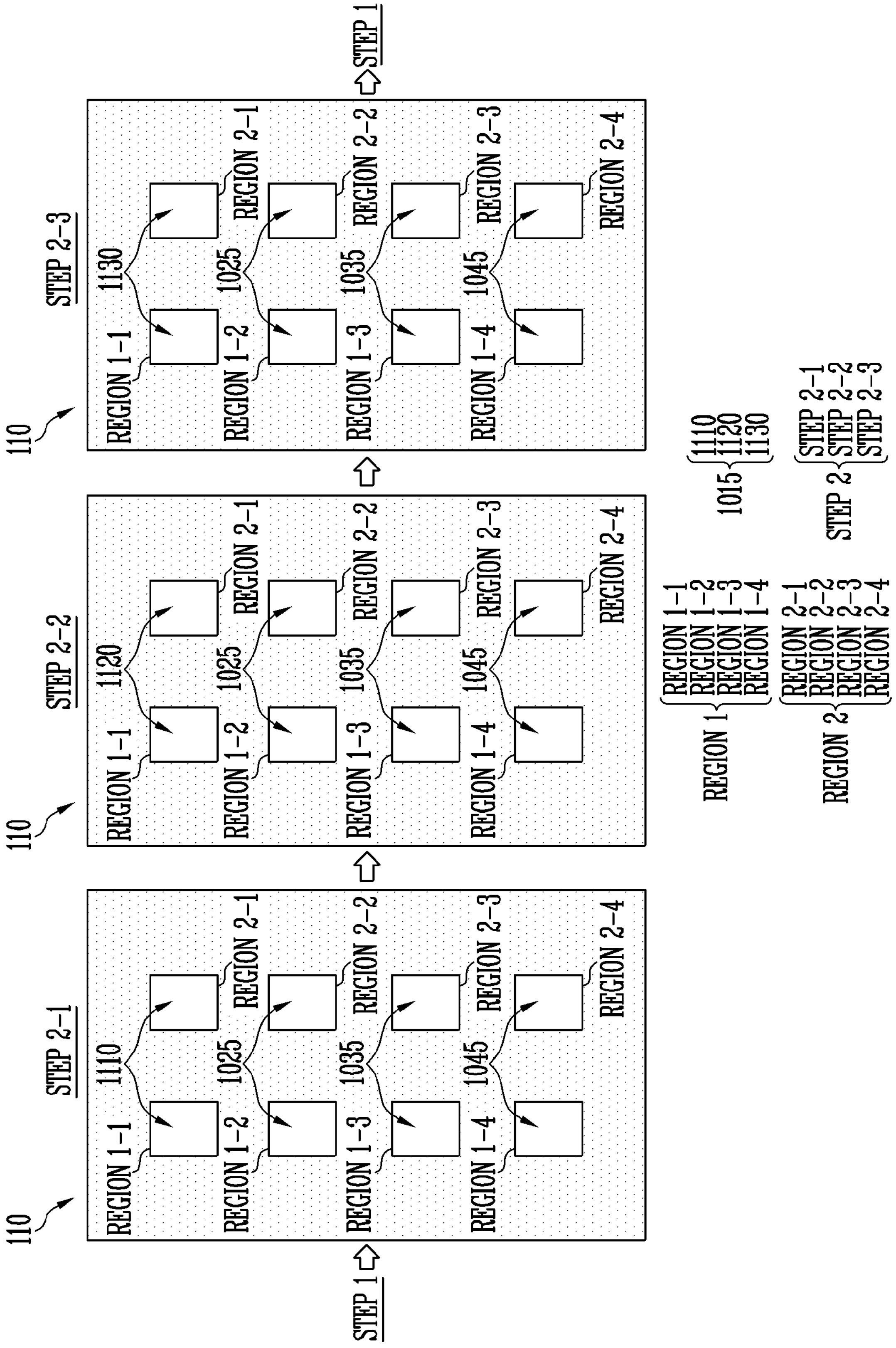

FIG. 11 is a diagram illustrating in more detail a second step shown in FIG. 10.

FIG. 12 is a table illustrating a method for acquiring a life time graph of the red sub-pixel by measuring luminances of a $(1\text{-}1)^{th}$ region, a $(1\text{-}2)^{th}$ region, a $(2\text{-}1)^{th}$ region, and a $(2\text{-}2)^{th}$ region.

FIG. 13 is a table illustrating a method for acquiring a life time graph of the green sub-pixel by measuring luminances of the (1-1)*th* region, a $(1\text{-}3)^{th}$ region, the $(2\text{-}1)^{th}$ region, and a $(2\text{-}3)^{th}$ region.

FIG. 14 is a table illustrating a method for acquiring a life time graph of the blue sub-pixel by measuring luminances of the $(1\text{-}1)^{th}$ region, a $(1\text{-}4)^{th}$ region, the $(2\text{-}1)^{th}$ region, and a $(2\text{-}4)^{th}$ region.

DETAILED DESCRIPTION

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

Hereinafter, exemplary embodiments will be described in detail with reference to the accompanying drawings.

FIG. 1 is a system block diagram of a display device 100 in accordance with embodiments of the present disclosure.

Referring to FIG. 1, the display device 100 in accordance with the embodiments of the present disclosure may include a display panel 110, a data driver 120, a scan driver 130, an emission driver 140, a timing controller 150, and the like.

The display panel 110 may include a substrate SUB. The display panel 110 may include a plurality of data lines DL1, . . . , and DLm disposed on the substrate SUB. Here, m may be an integer of 2 or more. A data voltage output from the data driver 120 may be applied to the plurality of data lines DL1, . . . , and DLm.

The display panel 110 may include a plurality of scan lines S11, . . . , and S1*n*, S21, . . . , and S2*n*, S31, . . . , and S3*n*, and S41, . . . , and S4*n* disposed on the substrate SUB. Here, n may be a natural number of 2 or more. A scan signal output from the scan driver 130 may be input to the plurality of scan lines S11, . . . , and S1*n*, S21, . . . , and S2*n*, S31, . . . , and S3*n*, and S41, . . . , and S4*n*.

The display panel 110 may include a plurality of emission control lines E1, . . . , and En disposed on the substrate SUB. An emission signal output from the emission driver 140 may be input to the plurality of emission control lines E1, . . . , and En.

The substrate SUB may be, for example, a glass substrate. Also, the substrate SUB may be, for example, a plastic substrate which is bendable, to provide a flexible function. The plastic substrate may be, for example, a polyimide substrate (also, abbreviated as a PI substrate).

The data driver 120 may receive image data RGB and a data driving circuit control signal DCS, which are input from the timing controller 150, to generate a data voltage, and output the generated data voltage to the plurality of data lines DL1, . . . , and DLm.

The scan driver 130 may receive a scan driving circuit control signal SCS, which is input from the timing controller 150, to generate a scan signal, and output the generated scan signal to the plurality of scan lines S11, . . . , and S1*n*, S21, . . . , and S2*n*, S31, . . . , and S3*n*, and S41, . . . , and S4*n*.

The emission driver 140 may receive an emission driving circuit control signal ECS, which is input from the timing controller 150, to generate an emission signal, and output the generated emission signal to the plurality of emission control lines E1, . . . , and En.

The timing controller 150 may be supplied with input image data IRGB and various control signals through a predetermined interface from an external host system (not shown) such as an Application Processor (AP). The interface may include, for example, a Low Voltage Differential Signaling (LVDS), a Serial Peripheral Interface (SPI), an I2C, an embedded Display Port (eDP), and the like.

The timing controller 150 may generate and output the scan driving circuit control signal SCS, the emission driving circuit control signal ECS, the data driving circuit control signal DCS, and the like, based on the input image data IRGB and the control signals. The timing controller 150 may generate image data RGB by realigning the input image data IRGB, and output the generated image data RGB to the data driver 120.

The data driver 120 may output data voltages corresponding to a grayscale of the image data RGB to the plurality of data lines DL1, . . . , and DLm based on the image data RGB, the data driving circuit control signal DCS, and the like.

The scan driver 130 may generate scan signals having a turn-on logic level or a turn-off logic level, and output the generated scan signals to the plurality of scan lines S11, . . . , and S1*n*, S21, . . . , and S2*n*, S31, . . . , and S3*n*, and S41, . . . , and S4*n*, corresponding to a timing. The plurality of scan lines may include, for example, first scan lines S11, . . . , and S1*n*, second scan lines S21, . . . , and S2*n*, third scan lines S31, . . . , and S3*n*, and fourth scan lines S41, . . . , and S4*n*.

Meanwhile, the scan signal having the turn-on logic level may be a high level voltage or a low level voltage. The scan signal having the turn-of logic level may be the low level voltage or the high level voltage.

For example, a turn-on logic level of a P-channel Metal Oxide Semiconductor (PMOS) transistor may be a low level voltage, and a turn-off logic level of the PMOS transistor may be a high level voltage.

For example, a turn-on logic level of an N-channel Metal Oxide Semiconductor (NMOS) transistor may be a high level voltage, and a turn-off logic level of the NMOS transistor may be a low level voltage.

Referring to FIG. 1, one sub-pixel SP located on the substrate SUB may be electrically connected to one data line DLj. Here, j may be a natural number of 1 or more. The sub-pixel SP may receive a data voltage supplied from the data line DLj electrically connected to the corresponding sub-pixel SP corresponding to a timing at which the scan signal having the turn-on logic level is input.

Referring to FIG. 1, the one sub-pixel SP located on the substrate SUB may be electrically connected to a first scan line S1*i*, a second scan line S2*i*, a third scan line S3*i*, and a fourth scan line S4*i*. Here, i may be an integer of 1 or more. The number of scan lines electrically connected to the one sub-pixel SP may vary according to a design of the structure of the sub-pixel SP.

The emission driver 140 may generate emission signals having a turn-on logic level or a turn-off logic level, and output the generated emission signals to the plurality of emission control lines E1, . . . , and En corresponding to a timing. The emission signal having the turn-on logic level may be a high level voltage or a low level voltage. The emission signal having the turn-off logic level may be the low level voltage or the high level voltage.

Referring to FIG. 1, the one sub-pixel SP located on the substrate SUB may be electrically connected to an emission control line Ei. The number of emission control lines electrically connected to the one sub-pixel SP may vary according to the design of the structure of the sub-pixel SP.

The data driver 120 may be located at one side (e.g., an upper side or a lower side) of the display panel 110, and be located at two or more sides (e.g., the upper side and the lower side) of the display panel 110.

The scan driver 130 may be located at one side (e.g., a left side or a right side) of the display panel 110, and be located at two or more sides (e.g., the left side and the right side) of the display panel 110.

The emission driver 140 may be located at one side (e.g., a left side or a right side) of the display panel 110, and be located at two or more sides (e.g., the left side and the right side) of the display panel 110.

The plurality of data lines DL1, . . . , and DLm may extend in a first direction. The plurality of scan lines S11, . . . , and S1*n*, S21, . . . , and S2*n*, S31, . . . , and S3*n*, and S41, . . . , and S4*n* may extend in a second direction different from the first direction. The plurality of emission control lines E1, . . . , and En may extend in the second direction.

In an example, the first direction may be a longitudinal direction (also, referred to as a column direction, a top-bottom direction, or a vertical direction), and the second direction may be a lateral direction (e.g., a row direction, a left-right direction, or a horizontal direction). However, the present disclosure is not limited thereto.

The data driver 120, the scan driver 130, the emission driver 140, and the timing controller 150, which are shown in FIG. 1, are classified according to a function for driving the display panel 110. The above-described components may be respectively implemented as separate integrated circuits, and two or more components among the above-described components may be integrated as one integrated circuit.

Referring to FIG. 1, the display device 100 in accordance with the embodiments of the present disclosure may further include a power management circuit (not shown) for supplying a first power voltage VDD, a second power voltage VSS, a third power voltage Vint1 (also, referred to as a first initialization voltage), and a fourth power voltage Vint2 (also, referred to as a second initialization voltage), which are used to drive the display panel 110.

The display device 100 in accordance with the embodiments of the present disclosure may be a self-luminous display device which autonomously emits light without including any backlight or the like.

When the display device 100 in accordance with the embodiments of the present disclosure is the self-luminous display device, the sub-pixel SP may include a light emitting element. The light emitting element may be, for example, an organic light emitting element including an organic light emitting layer or an inorganic light emitting element including an inorganic light emitting layer.

FIG. 2 is a diagram illustrating a pixel PX in accordance with embodiments of the present disclosure.

Referring to FIG. 2, the pixel PX in accordance with the embodiments of the present disclosure may include two or more sub-pixels SP.

For example, one pixel PX may include a first sub-pixel SP1, a second sub-pixel SP2, and a third sub-pixel SP3.

The first sub-pixel SP1, the second sub-pixel SP2, and the third sub-pixel SP3 may respectively emit first primary color light, second primary color light, and third primary color light.

The first sub-pixel SP1 may be a sub-pixel SP emitting light of a first color. The second sub-pixel SP2 may be a sub-pixel SP emitting light of a second color different from the first color. The third sub-pixel SP3 may be a sub-pixel SP emitting light of a third color different from the first color and the second color.

The first color may be, for example, a color belonging to a red wavelength range. The second color may be, for example, a color belonging to a green wavelength range. The third color may be, for example, a color belonging to a blue wavelength range.

For example, the first sub-pixel SP1 may emit light belonging to a wavelength range of about 630 nm to about 750 nm. For example, the second sub-pixel SP2 may emit light belonging to a wavelength range of about 495 nm to about 570 nm. For example, the third sub-pixel SP3 may emit light belonging to a wavelength range of about 450 nm to about 495 nm.

Unlike as described above, the first sub-pixel SP1 may emit light belonging to the green wavelength range or the blue wavelength range, the second sub-pixel SP2 may emit light belonging to the blue wavelength range or the red wavelength range, and the third sub-pixel SP3 may emit light belonging to the red wavelength range or the green wavelength range.

Hereinafter, for convenience of description, it is assumed and described that the first sub-pixel SP1 is a sub-pixel SP emitting red light, the second sub-pixel SP2 is a sub-pixel SP emitting green light, and the third sub-pixel SP3 is a sub-pixel SP emitting blue light. However, the present disclosure is not limited thereto.

The one pixel PX may include at least one first sub-pixel SP1. The one pixel PX may include at least one second sub-pixel SP2. The one pixel PX may include at least one third sub-pixel SP3.

Referring to FIG. 2, a same number of first, second, and third sub-pixels SP1, SP2, and SP3 may be included in the one pixel PX. For example, one first sub-pixel SP1, one second sub-pixel SP2, and one third sub-pixel SP3 may be included in the one pixel PX.

Alternatively, a number of any one of first, second, and third sub-pixels SP1, SP2, and SP3 included in the one pixel PX may be different from numbers of the other two sub-pixels. For example, a number of first sub-pixels SP1 included in the one pixel PX may be different from a number of second sub-pixels SP2 included in the one pixel PX, and may be different from a number of third sub-pixels SP3 included in the one pixel PX.

Referring to FIG. 2, emission surfaces of the first, second, and third sub-pixels SP1, SP2, and SP3 included in the one pixel PX, through which light is emitted, may have the same area.

Alternatively, an area of an emission surface of any one of the first, second, and third sub-pixels SP1, SP2, and SP3 included in the one pixel PX may be different from areas of emission surfaces of the other two sub-pixels.

Referring to FIG. 2, the first sub-pixel SP1, the second sub-pixel SP2, and the third sub-pixel SP3, which are included in the one pixel PX, may be arranged side by side in a lateral direction.

Alternatively, the first sub-pixel SP1, the second sub-pixel SP2, and the third sub-pixel SP3, which are included in the one pixel PX, may be arranged side by side in a longitudinal direction, be arrange in a "i" shape, be arranged "L" shape, or be arranged in a rhombic shape or the like according to a design.

According to the level of a data voltage input to sub-pixels SP, the grayscale of an image displayed by one pixel PX including the corresponding sub-pixels SP may vary.

FIG. 3 is a circuit diagram exemplarily illustrating a sub-pixel SP in accordance with embodiments of the present disclosure.

In FIG. 3, for convenience of description, a sub-pixel SP which is located on an $i^{th}$ horizontal line (for example, $i^{th}$ pixel row) and is connected to a jt h data line DLj will be described as an example.

Referring to FIG. 3, the sub-pixel SP in accordance with the embodiments of the present disclosure may include a light emitting element LE, first to seventh transistors T1 to T7, a storage capacitor Cst, and the like.

The light emitting element LE may include a first electrode electrically connected to a fourth node N4 and a second electrode electrically connected to a second power line PL2 to which the second power voltage VS S is supplied. The first electrode of the light emitting element LE may be an anode electrode. The second electrode of the light emitting element LE may be the cathode electrode. The light emitting element LE may generate (for example, emit) light with a predetermined luminance corresponding to an amount of current (for example, driving current) supplied from the first transistor T1.

In an embodiment, the light emitting element LE may be an organic light emitting diode (OLED) including an organic light emitting layer. In another embodiment, the light emitting element LE may be an inorganic light emitting element including an inorganic material. In another embodiment, the light emitting element LE may be a light emitting element configured with a combination of an inorganic material and an organic material. Alternatively, the light emitting element LE may have a form in which a plurality of inorganic light emitting elements are connected in parallel and or series between the second power line PL2 and the fourth node N4.

Referring to FIG. 3, a gate electrode of the first transistor T1 may be electrically connected to a first node N1. A first electrode (for example, source electrode or drain electrode) of the first transistor T1 may be electrically connected to a second node N2. A second electrode (for example, drain electrode or source electrode) of the first transistor T1 may be electrically connected to a third node N3.

The first transistor T1 may serve as a driving transistor configured to supply a driving current to the light emitting element LE. The level of a voltage applied to the gate electrode of the first transistor T1 may vary according to the level of a voltage applied to the first node N1.

The driving current flows in a direction toward the second power line PL2 to which the second power voltage VSS is applied from the second node N2 to which a voltage substantially equal to the first power voltage VDD is applied via the first transistor T1 and the light emitting element LE. Accordingly, a voltage level of the first power voltage VDD may be set higher than a voltage level of the second power voltage VSS.

The second transistor T2 may be configured to switch electrical connection between the $j^{th}$ data line DLj (hereinafter, abbreviated as a data line DLj) and the second node N2. The second transistor T2 may also be designated as a switching transistor. A gate electrode of the second transistor T2 may be electrically connected to an $i^{th}$ first scan line S1*i* (hereinafter, abbreviated as a first scan line S1*i*). The second transistor T2 may be turned on when a first scan signal GW[i] having a turn-on level is applied to the first scan line S1*i*. When the second transistor T2 is turned on, the data line DLj and the second node N2 may be electrically connected to each other.

The third transistor T3 may be configured to switch electrical connection between the second electrode of the first transistor T1 and the gate electrode of the first transistor T1. The third transistor T3 may also be designated as a compensation transistor. The third transistor T3 may be electrically connected to the second electrode of the first transistor T1 at the third node N3. The third transistor T3 may be electrically connected to the gate electrode of the first transistor T1 at the first node N1.

A gate electrode of the third transistor T3 may be electrically connected to an $i^{th}$ second scan line S2*i* (hereinafter, abbreviated as a second scan line S2*i*). The third transistor T3 may be turned on when a second scan signal GC[i] having the turn-on level is supplied to the second scan line S2*i*. When the third transistor T3 is turned on, the second electrode and the gate electrode of the first transistor T1 may be electrically connected to each other. When the third transistor T3 is turned on, the first transistor T1 may be diode connected.

The fourth transistor T4 may be configured to switch electrical connection between the gate electrode of the first transistor T1 and a first initialization voltage line VINTL1. The fourth transistor T4 may also be designated as a first initialization transistor. The fourth transistor T4 may be electrically connected to the gate electrode of the first transistor T1 at the first node N1. The fourth transistor T4 may be electrically connected to the third transistor T2 at the first node N1.

A gate electrode of the fourth transistor T4 may be electrically connected to an third scan line S3*i* (hereinafter, abbreviated as a third scan line S3*i*). The fourth transistor T4 may be turned on when a third scan signal GI[i] having the turn-on level is supplied to the third scan line S3*i*. When the fourth transistor T4 is turned on, a voltage of the first node N1 (or a voltage of the gate electrode of the first transistor T1) may be initialized to the first initialization voltage VINT1.

The fifth transistor T5 may be configured to switch electrical connection between a first power line PL1 and the first electrode of the driving transistor. The fifth transistor T5 may also be designated as a first emission control transistor.

The first transistor T1 and the fifth transistor T5 may be electrically connected to each other at the second node N2.

A gate electrode of the fifth transistor T5 may be electrically connected to an $i^{th}$ emission control line Ei (hereinafter, abbreviated as an emission control line Ei). The fifth transistor T5 may be turned on when an emission signal EM[i] having the turn-on level is supplied to the emission control line Ei. When the fifth transistor T5 is turned on, the first power voltage VDD may be applied to the second node N2.

The sixth transistor T6 may be configured to switch electrical connection between the second electrode of the first transistor T1 and the first electrode of the light emitting element LE. The sixth transistor T6 may be electrically connected to the first transistor T1 at the third node N3. The sixth transistor T6 may be electrically connected to the first electrode of the light emitting element LE at the fourth node N4. The sixth transistor T6 may also be designated as a second emission control transistor.

Referring to FIG. 3, a gate electrode of the sixth transistor T6 may be electrically connected to the emission control line Ei. The sixth transistor T6 may be turned on when the emission signal EM[i] having the turn-on level is supplied to the emission control line Ei. That is, operation timings of the sixth transistor T6 and the fifth transistor T5 may be controlled by the same emission signal EM[i]. Accordingly, the sixth transistor T6 and the fifth transistor T5 may be turned on or turned off at the substantially same timing.

Meanwhile, although it is illustrated that the sixth transistor T6 and the fifth transistor T5 are electrically connected to the same emission control line Ei, this is merely illustrative. The operation timings of the sixth transistor T6 and the fifth transistor T5 may be controlled by emission signals supplied through different emission control lines.

The seventh transistor T7 may be configured to switch electrical connection between the first electrode of the light emitting element LE and a second initialization voltage line VINTL2. The seventh transistor T7 may also be designated as a second initialization transistor. The seventh transistor T7 and the first electrode of the light emitting element LE may be electrically connected to each other at the fourth node N4.

A gate electrode of the seventh transistor T7 may be electrically connected to a fourth scan line S4*i*. The seventh transistor T7 may be turned on when a fourth scan signal GB [i] having the turn-on level is supplied to the fourth scan line S4*i*. When the seventh transistor T7 is turned on, the fourth power voltage VINT2 may be applied to the fourth node N4. When the fourth power voltage VINT2 is applied to the fourth node N4, a voltage applied to the first electrode of the light emitting element LE may be initialized to the fourth power voltage VINT2.

The storage capacitor Cst may include one end electrically connected to the first power line PL1 and the other end electrically connected to the first node N1. The storage capacitor Cst may store a difference voltage between the first power voltage VDD applied to the first power line PL1 and a voltage obtained by subtracting an absolute threshold voltage from a data voltage VDATA applied to the first node N1.

Referring to FIG. 3, at least one transistor among the first to seventh transistors T1 to T7 of the sub-pixel SP in accordance with the embodiments of the present disclosure may be a polycrystalline silicon transistor including a semiconductor layer of polycrystalline silicon (also, abbreviated as poly-silicon). The polycrystalline silicon transistor may be, for example, a transistor including a semiconductor layer of a Low Temperature Polycrystalline Silicon (LTPS). The polycrystalline silicon transistor has a high electron mobility as compared with an amorphous silicon transistor including a semiconductor layer of amorphous silicon (also, abbreviated as a-Si). Accordingly, the polycrystalline silicon transistor may have a rapid driving characteristic as compared with the amorphous silicon transistor.

Each of the first transistor T1, the second transistor T2, the fifth transistor T5, the sixth transistor T6, and the seventh transistor T7 may be a PMOS transistor or an NMOS transistor.

Each of the third transistor T3 and the fourth transistor T4 may be an oxide semiconductor transistor including a semiconductor layer configured with an oxide semiconductor.

The oxide semiconductor transistor has a high electron mobility as compared with the amorphous silicon transistor. The oxide semiconductor transistor may have a low electron mobility as compared with the polycrystalline silicon transistor. The oxide semiconductor transistor may have a small leakage current amount in a turn-off state as compared with the polycrystalline silicon transistor.

Each of the third transistor T3 and the fourth transistor T4 may be an NMOS transistor or a PMOS transistor.

Hereinafter, it is assumed and described that the sub-pixel in accordance with the embodiments of the present disclosure includes the first transistor T1, the second transistor T2, the fifth transistor T5, the sixth transistor T6, and the seventh transistor T7, which are implemented with a PMOS transistor, and the third transistor T3 and the fourth transistor T4, which are implemented with an NMOS transistor. However, the present disclosure is not limited thereto.

Meanwhile, the first to seventh transistors T1 to T7 may be formed on the substrate SUB (see FIG. 1), and the substrate SUB may be a polyimide substrate.

When light is introduced into the polyimide substrate, there may occur a phenomenon in which negative charges (for example, – charges) are guided toward a transistor from the polyimide substrate. The phenomenon is referred to as a "polyimide substrate charging (or PI substrate charging) phenomenon."

When the polyimide substrate charging phenomenon occurs, a driving characteristic of a transistor located on a region in which the corresponding phenomenon occurs may be changed. The change in the driving characteristic may be, for example, a change in threshold voltage (also, referred to as Vth) of the transistor.

Referring to FIG. 3, when a threshold voltage of the first transistor T1 is changed by the polyimide substrate charging phenomenon, a current amount of current flowing through the light emitting element LE may vary. Since a luminance of the light emitting element LE is controlled by the current amount of current flowing through the light emitting element LE, the luminance of the light emitting element LE may vary according to the change in the threshold voltage of the first transistor T1.

Also, referring to FIG. 3, when a threshold voltage of the third transistor T3 is changed (for example, a threshold voltage of the third transistor T3 is negative-shifted) by the polyimide substrate charging phenomenon, the voltage applied to the first node N1 varies. Accordingly, the voltage applied to the other end of the storage capacitor Cst varies, and therefore, the level of the voltage applied to the gate electrode of the first transistor T1 varies. As the voltage applied to the gate electrode of the first transistor T1 varies, a current amount of current flowing through the first transistor T1 may vary. The current amount of current flowing through the light emitting element LE may vary.

As described above, when the polyimide substrate charging phenomenon occurs due to light, the luminance of the light emitting element LE located at the periphery of a region in which the polyimide substrate charge phenomenon occurs may vary.

The light causing the polyimide substrate charging phenomenon may be light (i.e., external light) incident onto the substrate SUB (see FIG. 1) from the outside of the display panel 110 (see FIG. 1). The light causing the polyimide substrate charging phenomenon may be light (i.e., internal light) incident onto the substrate SUB (see FIG. 1) from the inside of the display panel 110 as the sub-pixel SP emits light.

The polyimide substrate charging phenomenon is also referred to as a thin film transistor resulting luminance decrease (also, referred to as a "TFT resulting luminance decrease"). When influence caused by light is removed (or reduced), the corresponding phenomenon may be easily reduced. In this respect, the polyimide substrate charging phenomenon is distinguished from an afterimage viewing phenomenon (also, referred to as a "sticking phenomenon") in which the luminance of the light emitting element LE is lowered as the light emission efficiency of the light emitting element LE is deteriorated due to degradation of the light emitting element LE.

The afterimage viewing phenomenon due to the degradation of the light emitting element LE may occur when the light emitting element LE includes an organic light emitting layer. The afterimage viewing phenomenon due to the degradation of the light emitting element LE may not be easily reduced. Alternatively, the afterimage viewing phenomenon due to the degradation of the light emitting element LE may permanently occur in some cases.

Accordingly, a time taken for the luminance of the light emitting element LE to decrease by a predetermined ratio is measured by measuring a luminance change of the light emitting element LE according to time. The measured time may be defined as a "life time of the display panel."

However, when the life time of the display panel is measured, it is difficult to distinguish a luminance decrease of the light emitting element due to the polyimide substrate charge phenomenon from a luminance decrease of the light emitting element due to the degradation of the light emitting element, and therefore, a method of objectively measuring a life time of the display panel is required.

FIG. 4 illustrates an example of a method 400 of measuring a life time of the display panel in accordance with embodiments of the present disclosure.

Referring to FIG. 4, the method 400 in accordance with the embodiments of the present disclosure may include a first step STEP 1 and a second step STEP 2.

Referring to FIG. 4, the display panel 110 may include a first region REGION 1 and a second region REGION 2 surrounding the first region REFION1 and not overlapping with the first region REGION 1. One or more pixels PX may be included in each of the first region REGION 1 and the second region REGION 2.

In the first step STEP 1, a data voltage for displaying a low grayscale image may be input to the pixel PX located in the first region REGION 1. The data voltage may be supplied from an external power source or the data driver (see FIG. 1). For example, when measuring the life time of the display panel before electrically connecting the data driving circuit to the display panel, the data voltage may be directly input from a separate power source other than the aforementioned data driving circuit to the data lines connected to the pixels in first region REGION 1.

The low grayscale image may include, for example, an image of a predetermined grayscale level or less. In the present disclosure, the predetermined grayscale level may be a grayscale level which does not cause the polyimide substrate charging phenomenon or causes a very small level of the polyimide substrate charging phenomenon in peripheral sub-pixels.

The data voltage for displaying the low grayscale image may be, for example, a data voltage BLACK for displaying a black image. Hereinafter, for convenience of description, a case where the data voltage BLACK for displaying the black image is applied to the first region REGION 1 is described as an example. However, the present disclosure is not limited thereto.

The black image may be an image in which a red sub-pixel, a green sub-pixel, and a blue sub-pixel do not emit light at all. For example, when each of the red sub-pixel, the green sub-pixel, and the blue sub-pixel, which are included in one pixel, displays an image of grayscale 0 (zero), the corresponding pixel may display the black image.

The data voltage BLACK for displaying the black image may mean a data voltage for displaying an image of the grayscale 0 which is applied to the red sub-pixel, a data voltage for displaying an image of the grayscale 0 which is applied to the green sub-pixel, and a data voltage for displaying an image of the grayscale 0 which is applied to the blue sub-pixel.

Referring to FIG. 4, in the first step STEP 1, a data voltage WHITE for displaying a white image may be input to the second region REGION 2. The data voltage WHITE for displaying the white image may mean, for example, a data voltage for displaying an image of grayscale 255 which is applied to the red sub-pixel, a data voltage for displaying an image of the grayscale 255 which is applied to the green sub-pixel, and a data voltage for displaying an image of the grayscale 255 which is applied to the blue sub-pixel.

Accordingly, in the first step STEP 1, the pixel PX located in the first region REGION 1 does not emit light. Therefore, no degradation of the light emitting element LE (see FIG. 3) occurs in the pixel PX located in the first region REGION 1.

Also, since pixels PX located at the periphery of the pixel PX located in the first region REGION 1 do not emit light, influence due to internal light may be very little. Therefore, the polyimide substrate charging phenomenon due to internal light hardly occurs in the pixel PX located in the first region REGION 1.

On the other hand, the pixel PX located in the second region REGION 2 emits light. Therefore, degradation of the light emitting element LE (see FIG. 3) occurs in the pixel PX located in the second region REGION 2.

Also, since pixels PX located at the periphery of the pixel PX located in the second region REGION 2 emit light, influence due to internal light may be large. Therefore, the polyimide substrate charging phenomenon due to internal light may occur in the pixel PX located in the second region REGION 2.

In the second step STEP2, the data voltage WHITE for displaying the white image may be input to the pixels PX located in the first region REGION 1 and the second region REGION 2.

In the second step STEP 2, although the substantially same data voltage is input to the pixels PX located in the first region REGION 1 and the second region REGION 2, the pixels PX located in the first region REGION 1 and the second region REGION 2 may emit lights with different luminances due to the degradation of the light emitting element LE (see FIG. 3) and the polyimide substrate charging phenomenon.

In the second step STEP 2, a luminance of the pixel PX located in the first region REGION 1 may be compared with a luminance of the pixel PX located in the second region REGION 2, thereby a decreasing ratio of the luminance of the pixel PX located in the second region REGION 2 may be calculated.

In the second step STEP 2, after the luminance of the pixel PX located in the first region REGION 1 is compared with the luminance of the pixel PX located in the second region REGION 2, the first step STEP 1 and the second step STEP 2 may be repeated.

That is, the first step STEP 1 is a step of causing a luminance change of the pixel PX. The luminance change may be caused by a decrease in light emission efficiency of a light emitting layer due to light emission of a sub-pixel. Also, the luminance change may be caused by the polyimide substrate charging phenomenon caused by sub-pixels located at the periphery of the sub-pixel and emitting light in one pixel PX.

The second step STEP 2 is a step of measuring a changed luminance of a pixel PX following the first step STEP 1. In order to measure the changed luminance of the pixel PX, the data voltage WHITE for displaying the white image may be input to the pixel PX.

By repeating the method 400 in accordance with the embodiments of the present disclosure, a life time of the display panel 100 may be calculated.

The first step STEP 1 and the second step STEP 2, which are described above, correspond to a process of measuring durability of the display panel 110, and this process is also referred to as an aging process.

Referring to FIG. 4, it is illustrated that the second region REGION 2 is the whole of the other region of the first region REGION 1. However, the present disclosure is not limited thereto. For example, an additional region except the first region REGION 1 and the second region REGION 2 may exist in the display panel 110. The first region REGION 1 and the second region REGION 2 may not be in direct contact with each other but may be spaced apart from each other. An intermediate region (not shown) may exist between the first region REGION 1 and the second region REGION 2.

The first region REGION 1 and the second region REGION 2 of the display panel 110 may have the same area.

FIG. 5 is a luminance change graph of the display panel, which is measured according to the method 400 shown in FIG. 4.

Referring to FIG. 5, the luminance change graph is a graph using time (TIME) as an x axis and ratio of luminances (LUMINANCE RATIO) as a y axis.

The ratio of luminances (LUMINANCE RATIO) is a value obtained by dividing a luminance of the second region REGION 2 (see FIG. 4) (LUMINANCE OF REGION 2), which is measured according to the lapse of time, by a luminance of the first region REGION 1 (see FIG. 4) (LUMINANCE OF REGION 1).

Referring to FIG. 5, the time at which the time (TIME) is 0 is a time before the degradation of the light emitting element and the polyimide substrate charging phenomenon occur, and the calculated ratio of luminances is 1. Here, 1 corresponds to an initial value (INITIAL).

Referring to FIG. 5, a period between an initial time and a first time t1 is defined as a first period P1. During the first period P1, both the degradation of the light emitting element and the polyimide substrate charging phenomenon (for example, a threshold voltage of a transistor in a sub-pixel is negative-shifted) occur. Accordingly, the ratio of luminances may rapidly decrease. The polyimide substrate charging phenomenon reaches a maximum value at the first timing t1, and may not occur after the first timing t1.

A period between the first time t1 and a second timing t2 is defined as a second period P2. During the second period P2, the degradation of the light emitting element may continuously occur. Accordingly, during the second period P2, the ratio of luminances may continuously decrease over time. However, the second period P2 is a period after the polyimide substrate charging phenomenon is completed, and a slope of the luminance ratio decreases in the second period P2 may be smaller than that in the first period P1.

A period between the second timing t2 and a third timing t3 is defined as a third period P3. The third period P3 may be a period configured to initialize the polyimide substrate charging phenomenon.

For example, in the third period P3, the data voltage BLACK for displaying the black image may be input to the first region REGION 1 and the second region REGION 2 at the same time. Accordingly, the influence due to internal light may be reduced during the third period P3.

A fourth period P4 is defined as a period between the third timing t3 and a fourth timing t4. The fourth period P4 may include a period in which both the polyimide substrate charging phenomenon and the degradation of the light emitting element occur. A period for reducing the polyimide substrate charging phenomenon (i.e., a period of performing a function of the third period P3) may further exist after the fourth period P4.

Referring to FIG. 5, the ratio of luminances may decrease during the first period P1, the second period P2, and the fourth period P4, except the third period P3.

The time taken for the ratio of luminances to reach a target value TARGET from the initial value INITIAL may be defined as a "life time of the display panel."

Referring to FIG. 5, the time at which the ratio of luminances reaches the target value TARGET may be, for example, the fourth timing t4.

The target value TARGET shown in FIG. 5 is 0.93, which represents that the time taken for the ratio of luminances to reach a time at which the ratio of luminance decreases by 7% from the initial value INITIAL is defined as the "life time of the display panel." The target value TARGET may be defined as a value different from 0.93.

The "life time of the display panel" may be defined as a value obtained by adding lengths of the first period P1, the second period P2, the third period P3, and the fourth period P4. Alternatively, by considering only a period in which the display panel 110 (see FIG. 1) substantially emits light, the "life time of the display panel" may be defined as a value obtained by adding lengths of the first period P1, the second period P2, and the fourth period P4.

Referring to FIG. 4 and FIG. 5 described above, in the method 400 in accordance with the embodiments of the present disclosure, the life time of the display panel is measured by excluding a time period during which the polyimide substrate charging phenomenon occurs. Thus, the life time of the display panel 110 (see FIG. 1) may be objectively identified.

FIG. 6 illustrates another example of the method of measuring the life time of the display panel in accordance with the embodiments of the present disclosure.

A method 600 of measuring a life time of the display panel, which is shown in FIG. 6, has portions similar to the portions of the method 400 shown in FIG. 4 described above. Therefore, differences between the two methods will be mainly described, and common descriptions will be partially omitted.

Referring to FIG. 6, the method 600 in accordance with the embodiments of the present disclosure includes a first step STEP 1 and a second step STEP 2.

In the first step STEP 1, a first data voltage 610 is applied to the pixels PX located in the first region REGION 1, and a second data voltage 620 is applied to the pixels PX located in the second region REGION 2.

The first data voltage 610 may be the above-described data voltage WHITE (see FIG. 4) for the displaying the white image.

Accordingly, in the first step STEP 1, both the degradation of the light emitting element and the polyimide substrate charging phenomenon due to influence of internal light may occur in each pixel PX located in the first region REGION 1.

Alternatively, the first data voltage 610 may be a voltage for allowing only the red sub-pixel located in the first region REGION 1 to emit light, a voltage for allowing only the green sub-pixel located in the first region REGION 1 to emit light, or a voltage for allowing only the blue sub-pixel located in the first region REGION 1 to emit light.

For example, the first data voltage 610 may be a voltage for allowing the red sub-pixel to emit light with the grayscale 255 and allowing each of the green sub-pixel and the blue sub-pixel to emit light with the grayscale 0.

For example, the first data voltage 610 may be a voltage for allowing the green sub-pixel to emit light with the grayscale 255 and allowing each of the red sub-pixel and the blue sub-pixel to emit light with the grayscale 0.

For example, the first data voltage 610 may be a voltage for allowing the blue sub-pixel to emit light with the grayscale 255 and allowing each of the red sub-pixel and the green sub-pixel to emit light with the grayscale 0.

Accordingly, in the first step STEP 1, the degradation of the light emitting element occurs in each pixel PX, and the polyimide substrate charging phenomenon due to influence of internal light may not occur since an adjacent sub-pixel does not emit light.

In summary, in order to measure a life time of the sub-pixel located in the first region REGION 1, a luminance change may be measured with respect to each of a case where influence of internal light exists and a case where no influence of internal light exists.

Meanwhile, the second data voltage 620 may be the above-described data voltage BLACK (see FIG. 4) for displaying the black image.

Accordingly, in the first step STEP 1, both the degradation of the light emitting element and the polyimide substrate charging phenomenon due to influence of internal light may not occur in each pixel PX located in the second region REGION 2.

Alternatively, the second data voltage 620 may be a voltage for displaying an image of a complementary color of red (i.e., cyan), a voltage for displaying an image of a complementary color of green (i.e., magenta), or a voltage for displaying an image of a complementary color of blue (i.e., yellow).

For example, the second data voltage 620 may be a voltage for allowing the red sub-pixel to emit light with the grayscale 0 and allowing each of the green sub-pixel and the blue sub-pixel to emit light with the grayscale 255.

For example, the second data voltage 620 may be a voltage for allowing the green sub-pixel to emit light with the grayscale 0 and allowing each of the red sub-pixel and the blue sub-pixel to emit light with the grayscale 255.

For example, the second data voltage 620 may be a voltage for allowing the blue sub-pixel to emit light with the grayscale 0 and allowing each of the red sub-pixel and the green sub-pixel to emit light with the grayscale 255.

Accordingly, in the first step STEP 1, the degradation of the light emitting element does not occur in the sub-pixel (e.g., the red sub-pixel), and an adjacent sub-pixel does not emit light. Therefore, the polyimide substrate charging phenomenon due to influence of internal light may occur since an adjacent sub-pixel (e.g., the green sub-pixel and the blue sub-pixel) emits light.

That is, the first step STEP 1 is a step of causing a luminance change of the sub-pixel. The luminance change may be caused by a decrease in light emission efficiency of a light emitting layer due to light emission of a sub-pixel. Also, the luminance change may be caused by the polyimide substrate charging phenomenon occurring as sub-pixels located at the periphery of the sub-pixel emit light in one pixel PX.

The second step STEP 2 is a step of measuring a changed luminance of the sub-pixel following the first step STEP 1. In order to measure the changed luminance of the sub-pixel, a third data voltage 630 may be input to the sub-pixel. The third data voltage 630 applied in the second step STEP 2 may be a voltage for allowing only the red sub-pixel to emit light in the first region REGION 1 and the second region REGION 2, a voltage for allowing only the green sub-pixel to emit light in the first region REGION 1 and the second region REGION 2, or a voltage for allowing only the blue sub-pixel to emit light in the first region REGION 1 and the second region REGION 2.

In summary, in order to measure a life time of the sub-pixel located in the second region REGION 2, a luminance change may be measured with respect to each of a case where influence of internal light exists and a case where no influence of internal light exists.

Thus, in the method 600 in accordance with the embodiments of the present disclosure, the life time of a sub-pixel for each color may be more objectively identified by combining whether the degradation of the light emitting element occurs and whether the influence of internal light occurs.

A method of testing the life time of a sub-pixel for each color will be described in more detail below.

FIG. 7A is a table illustrating a life time of the red sub-pixel in accordance with the embodiment shown in FIG. 6 in a plurality of combinations.

Referring to FIG. 7A, according to whether the degradation of the light emitting element occurs and whether the influence of internal light occurs, a method of estimating a life time of the red sub-pixel in first to fourth combinations CASE 1 to CASE 4 is illustrated as a table.

Meanwhile, since FIG. 7A illustrates the method of estimating the life time of the red sub-pixel, all the first to fourth combinations CASE 1 to CASE 4 may allow only the red sub-pixel to emit light in the second step STEP 2. For example, in the second step STEP 2, a data voltage for allowing the red sub-pixel to emit light with the grayscale 255 may be applied, and a data voltage (hereinafter, referred to as "RED") for allowing each of the green sub-pixel and the blue sub-pixel to emit light with the grayscale 0.

In the first combination CASE 1, in the first step STEP 1, the data voltage WHITE for displaying the white image is applied to the first region REGION 1, and a data voltage for displaying a cyan image is applied to the second region REGION 2. The data voltage for displaying the cyan image (hereinafter, referred to as "CYAN") may be a data voltage for allowing each of the green sub-pixel and the blue sub-pixel to emit light with the grayscale 255 and a data voltage for allowing the red sub-pixel to emit light with the grayscale 0.

That is, the first combination CASE 1 is a case where influence of internal light exists in the first region REGION 1 and influence of light exists in the second region REGION 2.

In the second combination CASE 2, in the first step STEP 1, the data voltage WHITE for displaying the white image is applied to the first region REGION 1, and the data voltage BLACK for displaying the black image is applied to the second region REGION 2.

That is, the second combination CASE 2 is a case where influence of internal light exists in the first region REGION 1 and influence of internal light does not exists in the second region REGION 2.

In the third combination CASE3, the data voltage RED for displaying a red image is applied to the first region REGION 1, and the data voltage CYAN for displaying the cyan image is applied to the second region REGION 2.

That is, the third combination CASE 3 is a case where influence of internal light is not great in the first region REGION 1 and influence of internal light exists in the second region REGION 2.

In the fourth combination CASE 4, the data voltage RED for displaying the red image is applied to the first region REGION 1, and the data voltage BLACK for displaying the black image is applied to the second REGION 2.

That is, the fourth combination CASE 4 is a case where influence of internal light is not great in the first region REGION 1 and influence of internal light does not exists in the second region REGION 2.

Luminance ratios of the first to fourth combinations CASE 1 to CASE 4 will be described. When an image is displayed in various conditions, the life time of the red sub-pixel may be objectively identified.

According to experimental results, the life time of the red sub-pixel is longest when the red sub-pixel is operated in the second combination CASE 2. The life time of the red sub-pixel is medium when the red sub-pixel is operated in the first combination CASE 1 or the fourth combination CASE 4. The life time of the red sub-pixel is shortest when the red sub-pixel is operated in the third combination CASE 3.

FIG. 7B is a life time graph of the red sub-pixel for each combination shown in FIG. 7A.

The graph shown in FIG. 7B may be acquired when luminances are measured in the combinations shown in FIG. 7A according to the method 600 described in FIG. 6.

Thus, according to the method 600 in accordance with the embodiments of the present disclosure, the life time of the red sub-pixel may be objectively identified.

FIG. 8A is a table illustrating a life time of a green sub-pixel in accordance with the embodiment shown in FIG. 6 in a plurality of combinations.

Referring to FIG. 8A, according to whether the degradation of the light emitting element occurs and whether the influence of internal light occurs, a method of estimating a life time of the green sub-pixel in first to fourth combinations CASE 1 to CASE 4 is illustrated as a table.

Meanwhile, since FIG. 8A illustrates the method of estimating the life time of the green sub-pixel, all the first to fourth combinations CASE 1 to CASE 4 may allow only the green sub-pixel to emit light in the second step STEP 2. For example, in the second step STEP 2, a data voltage for allowing the green sub-pixel to emit light with the grayscale 255 (hereinafter, referred to as "GREEN") may be applied, and a data voltage for allowing each of the red sub-pixel and the blue sub-pixel to emit light with the grayscale 0.

In the first combination CASE 1, in the first step STEP 1, the data voltage WHITE for displaying the white image is applied to the first region REGION 1, and a data voltage for displaying a magenta image is applied to the second region REGION 2. The data voltage for displaying the magenta image (hereinafter, referred to as "MAGENTA") may be a data voltage for allowing each of the red sub-pixel and the blue sub-pixel to emit light with the grayscale 255 and a data voltage for allowing the green sub-pixel to emit light with the grayscale 0.

That is, the first combination CASE 1 is a case where influence of internal light exists in the first region REGION 1 and influence of light exists in the second region REGION 2.

In the second combination CASE 2, in the first step STEP 1, the data voltage WHITE for displaying the white image is applied to the first region REGION 1, and the data voltage BLACK for displaying the black image is applied to the second region REGION 2.

That is, the second combination CASE 2 is a case where influence of internal light exists in the first region REGION 1 and influence of internal light does not exists in the second region REGION 2.

In the third combination CASE3, the data voltage GREEN for displaying a green image is applied to the first region REGION 1, and the data voltage MAGENTA for displaying the magenta image is applied to the second region REGION 2.

That is, the third combination CASE 3 is a case where influence of internal light is not great in the first region REGION 1 and influence of internal light exists in the second region REGION 2.

In the fourth combination CASE 4, the data voltage GREEN for displaying the green image is applied to the first region REGION 1, and the data voltage BLACK for displaying the black image is applied to the second REGION 2.

That is, the fourth combination CASE 4 is a case where influence of internal light is not great in the first region REGION 1 and influence of internal light does not exists in the second region REGION 2.

Luminance ratios of the first to fourth combinations CASE 1 to CASE 4 will be described. When an image is displayed in various conditions, the life time of the green sub-pixel may be objectively identified.

According to experimental results, the life time of the green sub-pixel is longest when the green sub-pixel is operated in the second combination CASE 2. The life time of the green sub-pixel is medium when the green sub-pixel is operated in the first combination CASE 1 or the fourth combination CASE 4. The life time of the green sub-pixel is shortest when the green sub-pixel is operated in the third combination CASE 3.

FIG. 8B is a life time graph of the green sub-pixel for each combination shown in FIG. 8A.

The graph shown in FIG. 8B may be acquired when luminances are measured in the combinations shown in FIG. 8A according to the method 600 described in FIG. 6. Thus, according to the method 600 in accordance with the embodiments of the present disclosure, the life time of the green sub-pixel may be objectively identified.

FIG. 9A is a table illustrating a life time of a blue sub-pixel in accordance with the embodiment shown in FIG. 6 in a plurality of combinations.

Referring to FIG. 9A, according to whether the degradation of the light emitting element occurs and whether the influence of internal light occurs, a method of estimating a life time of the blue sub-pixel in first to fourth combinations CASE 1 to CASE 4 is illustrated as a table.

Meanwhile, since FIG. 9A illustrates the method of estimating the life time of the blue sub-pixel, all the first to fourth combinations CASE 1 to CASE 4 may allow only the blue sub-pixel to emit light in the second step STEP 2. For example, in the second step STEP 2, a data voltage for allowing the blue sub-pixel to emit light with the grayscale 255 (hereinafter, referred to as "BLUE") may be applied, and a data voltage for allowing each of the red sub-pixel and the green sub-pixel to emit light with the grayscale 0.

In the first combination CASE 1, in the first step STEP 1, the data voltage WHITE for displaying the white image is applied to the first region REGION 1, and a data voltage for displaying a yellow image is applied to the second region REGION 2. The data voltage for displaying the yellow image (hereinafter, referred to as "YELLOW") may be a data voltage for allowing each of the red sub-pixel and the green sub-pixel to emit light with the grayscale 255 and a data voltage for allowing the blue sub-pixel to emit light with the grayscale 0.

That is, the first combination CASE 1 is a case where influence of internal light exists in the first region REGION 1 and influence of light exists in the second region REGION 2.

In the second combination CASE 2, in the first step STEP 1, the data voltage WHITE for displaying the white image is applied to the first region REGION 1, and the data voltage BLACK for displaying the black image is applied to the second region REGION 2.

That is, the second combination CASE 2 is a case where influence of internal light exists in the first region REGION 1 and influence of internal light does not exists in the second region REGION 2.

In the third combination CASES, the data voltage BLUE for displaying a blue image is applied to the first region REGION 1, and the data voltage YELLOW for displaying the yellow image is applied to the second region REGION 2.

That is, the third combination CASE 3 is a case where influence of internal light is not great in the first region REGION 1 and influence of internal light exists in the second region REGION 2.

In the fourth combination CASE 4, the data voltage BLUE for displaying the blue image is applied to the first region REGION 1, and the data voltage BLACK for displaying the black image is applied to the second REGION 2.

That is, the fourth combination CASE 4 is a case where influence of internal light is not great in the first region REGION 1 and influence of internal light does not exists in the second region REGION 2.

Luminance ratios of the first to fourth combinations CASE 1 to CASE 4 will be described. When an image is displayed in various conditions, the life time of the blue sub-pixel may be objectively identified.

According to experimental results, the life time of the blue sub-pixel is longest when the blue sub-pixel is operated in the second combination CASE 2. The life time of the blue sub-pixel is medium when the blue sub-pixel is operated in the first combination CASE 1 or the fourth combination CASE 4. The life time of the blue sub-pixel is shortest when the blue sub-pixel is operated in the third combination CASE 3.

FIG. 9B is a life time graph of the blue sub-pixel for each combination shown in FIG. 9A.

The graph shown in FIG. 9B may be acquired when luminances are measured in the combinations shown in FIG. 9A according to the method 600 described in FIG. 6.

Thus, according to the method 600 in accordance with the embodiments of the present disclosure, the life time of the blue sub-pixel may be objectively identified.

Referring to FIGS. 6 to 9B described above, according to the method 600 in accordance with the embodiments of the present disclosure, the life time of each sub-pixel may be objectively identified.

FIG. 10 illustrates still another example of the method of measuring the life time of the display panel in accordance with the embodiments of the present disclosure.

Referring to FIG. 10, a method 1000 of measuring a life time of the display panel 110 includes a first step STEP 1 and a second step STEP 2.

The method 1000 may be applied to the display panel 110 including the first region REGION 1 and the second region REGION 2. The first region REGION 1 may include a $(1\text{-}1)^{th}$ region REGION 1-1, a $(1\text{-}2)^{th}$ region REGION 1-2, a $(1\text{-}3)^{th}$ region REGION 1-3, and a $(1\text{-}4)^{th}$ region REGION 1-4. The second region REGION 2 may include a (2-1) region REGION 2-1, a $(2\text{-}2)^{th}$ region REGION 2-2, a $(2\text{-}3)^{th}$ region REGION 2-3, and a $(2\text{-}4)^{th}$ region REGION 2-4.

In the first step STEP 1, a data voltage 1010 for displaying a white (for example, white color) image may be applied to the $(1\text{-}1)^{th}$ region REGION 1-1. The data voltage 1010 for displaying the white image may be equal to the "WHITE" described above in FIGS. 4, 7A, 8A and 9A.

In the first step STEP 1, a data voltage 1020 for displaying a red (for example, red color) image may be applied to the $(1\text{-}2)^{th}$ region REGION 1-2. The data voltage 1020 for displaying the red image may be equal to the "RED" described above in FIG. 7A.

In the first step STEP 1, a data voltage 1030 for displaying a green (for example, green color) image may be applied to the $(1\text{-}3)^{th}$ region REGION 1-3. The data voltage 1030 for displaying the green image may be equal to the "GREEN" described above in FIG. 8A.

In the first step STEP 1, a data voltage 1040 for displaying a blue (for example, blue color) image may be applied to the $(1\text{-}4)^{th}$ region REGION 1-4. The data voltage 1040 for displaying the blue image may be equal to the "BLUE" described above in FIG. 9A.

In the first step STEP 1, a data voltage 1012 for displaying a black (for example, black color) image may be applied to the $(2\text{-}1)^{th}$ region REGION 2-1. The data voltage 1012 for displaying the black image may be equal to the "BLACK" described above in FIGS. 4, 7A, 8A, and 9A.

In the first step STEP 1, a data voltage 1022 for displaying a cyan (for example, cyan color) image may be applied to the $(2\text{-}2)^{th}$ region REGION 2-2. The data voltage 1022 for displaying the cyan image may be equal to the "CYAN" described above in FIG. 7A.

In the first step STEP 1, a data voltage 1032 for displaying a magenta (for example, magenta color) image may be applied to the $(2\text{-}3)^{th}$ region REGION 2-3. The data voltage 1032 for displaying the magenta image may be equal to the "MAGENTA" described above in FIG. 8A.

In the first step STEP 1, a data voltage 1042 for displaying a yellow (for example, yellow color) image may be applied to the $(2\text{-}4)^{th}$ region REGION 2-4. The data voltage 1042 for displaying the yellow image may be equal to the "YELLOW" described above in FIG. 9A.

In the second step STEP 2, a data voltage 1025 for displaying a red image may be applied to the (1-2)$^{th}$ region REGION 1-2 and the (2-2)$^{th}$ region REGION 2-2. The data voltage 1025 for displaying the red image may be equal to the "RED" described above in FIG. 7A.

In the second step STEP 2, a data voltage 1035 for displaying a green image may be applied to the (1-3)$^{th}$ region REGION 1-3 and the (2-3)$^{th}$ region REGION 2-3. The data voltage 1035 for displaying the green image may be equal to the "GREEN" described above in FIG. 8A.

In the second step STEP 2, a data voltage 1045 for displaying a blue image may be applied to the (1-4)$^{th}$ region REGION 1-4 and the (2-4)$^{th}$ region REGION 2-4. The data voltage 1045 for displaying the blue image may be equal to the "BLUE" described above in FIG. 9A.

Meanwhile, in the second step STEP 2, a data voltage 1015 for displaying a primary color image may be applied to the (1-1)$^{th}$ region REGION 1-1 and the (2-1)$^{th}$ region REGION 2-1.

The data voltage 1015 for displaying a primary color image may include the data voltage 1025 for displaying the red image, the data voltage 1035 for displaying the green image, and the data voltage 1045 for displaying the blue image. The data voltage 1015 for displaying the primary color image will be described in more detail with reference to FIG. 11.

According to the method 1000 in accordance with the embodiments of the present disclosure, the combinations illustrated in the tables shown in FIGS. 7A, 8A, and 9A described above may be easily tested in one display panel 110.

Accordingly, according to the method 1000 in accordance with the embodiments of the present disclosure, the life time of the display panel 110 may be objectively identified, and the time taken to measure the life time of the display panel may be very considerably reduced.

FIG. 11 is a diagram illustrating in more detail the second step STEP 2 shown in FIG. 10.

Referring to FIG. 11, the second step STEP 2 may include a (2-1)$^{th}$ step STEP 2-1, a (2-2)$^{th}$ step STEP 2-2, and a (2-3)$^{th}$ step STEP 2-3.

In the (2-1)$^{th}$ step STEP 2-1, a data voltage 1110 for displaying a red image may be applied to the (1-1)$^{th}$ region REGION 1-1 and the (2-2)$^{th}$ region REGION 2-1.

The data voltage 1110 for displaying the red image, which is applied to the (1-1)$^{th}$ region REGION 1-1 and the (2-1)$^{th}$ region REGION 2-1, may be substantially equal to the data voltage 1025 for displaying the red image, which is applied to the (1-2)$^{th}$ region REGION 1-2 and the (2-2)$^{th}$ region REGION 2-2.

In the (2-2)$^{th}$ step STEP 2-2, a data voltage 1120 for displaying a green image may be applied to the (1-1)$^{th}$ region REGION 1-1 and the (2-1)$^{th}$ region REGION 2-1.

The data voltage 1120 for displaying the green image, which is applied to the (1-1)$^{th}$ region REGION 1-1 and the (2-1)$^{th}$ region REGION 2-1, may be substantially equal to the data voltage 1035 for displaying the green image, which is applied to the (1-3)$^{th}$ region REGION 1-3 and the (2-3)$^{th}$ region REGION 2-3.

In the (2-3)$^{th}$ step STEP 2-3, a data voltage 1130 for displaying a blue image may be applied to the (1-1)$^{th}$ region REGION 1-1 and the (2-1)$^{th}$ region REGION 2-1.

The data voltage 1130 for displaying the blue image, which is applied to the (1-1)$^{th}$ region REGION 1-1 and the (2-1)$^{th}$ region REGION 2-1, may be substantially equal to the data voltage 1045 for displaying the blue image, which is applied to the (1-4)$^{th}$ region REGION 1-4 and the (2-4)$^{th}$ region REGION 2-4.

Since the second step STEP 2 includes the (2-1)$^{th}$ step STEP 2-1, the (2-2)$^{th}$ step STEP 2-2, and the (2-3)$^{th}$ step STEP 2-3, a method 1000 (see FIG. 10) of measuring a life time of the display panel in accordance with the embodiments of the present disclosure may express all the twelve combinations illustrated in FIGS. 7A, 8A, and 9A described above.

FIG. 12 is a table illustrating a method for acquiring a life time graph of the red sub-pixel by measuring luminances of the (1-1)*r* region REGION 1-1, the (1-2) region REGION 1-2, the (2-1)$^{th}$ region REGION 2-1, and the (2-2)$^{th}$ region REGION 2-2.

Referring to FIG. 12, according to the method 1000 (see FIG. 10) in accordance with the embodiments of the present disclosure, a method capable of acquiring the four combinations shown in FIG. 7A is illustrated.

Referring to FIG. 12, a life time graph of the red sub-pixel according to the first combination CASE 1 may be obtained by measuring a luminance of the (1-1)$^{th}$ region REGION 1-1 and a luminance of the (2-2)$^{th}$ region REGION 2-2 in each of the first step STEP 1 and the (2-1)$^{th}$ step STEP 2-1.

Referring to FIG. 12, a life time graph of the red sub-pixel according to the second combination CASE 2 may be obtained by measuring a luminance of the (1-1)$^{th}$ region REGION 1-1 and a luminance of the (2-1)$^{th}$ region REGION 2-1 in each of the first step STEP 1 and the (2-1)$^{th}$ step STEP 2-1.

Referring to FIG. 12, a life time graph of the red sub-pixel according to the third combination CASE 3 may be obtained by measuring a luminance of the (1-2)$^{th}$ region REGION 1-2 and a luminance of the (2-2)$^{th}$ region REGION 2-2 in each of the first step STEP 1 and the (2-1)$^{th}$ step STEP 2-1.

Referring to FIG. 12, a life time graph of the red sub-pixel according to the fourth combination CASE 4 may be obtained by measuring a luminance of the (1-2)$^{th}$ region REGION 1-2 and a luminance of the (2-1)$^{th}$ region REGION 2-1 in each of the first step STEP 1 and the (2-1)$^{th}$ step STEP 2-1.

Accordingly, according to the method 1000 (see FIG. 10) in accordance with the embodiments of the present disclosure, the life time graph of the red sub-pixel (e.g., the graph shown in FIG. 7B) may be acquired.

FIG. 13 is a table illustrating a method for acquiring a life time graph of the green sub-pixel by measuring luminances of the (1-1) region REGION 1-1, the (1-3) region REGION 1-3, the (2-1)$^{th}$ region REGION 2-1, and the (2-3)$^{th}$ region REGION 2-3.

Referring to FIG. 13, according to the method 1000 (see FIG. 10) in accordance with the embodiments of the present disclosure, a method capable of acquiring the four combinations shown in FIG. 8A is illustrated.

Referring to FIG. 13, a life time graph of the green sub-pixel according to the first combination CASE 1 may be obtained by measuring a luminance of the (1-1)$^{th}$ region REGION 1-1 and a luminance of the (2-3)$^{th}$ region REGION 2-3 in each of the first step STEP 1 and the (2-2)$^{th}$ step STEP 2-2.

Referring to FIG. 13, a life time graph of the green sub-pixel according to the second combination CASE 2 may be obtained by measuring a luminance of the (1-1)$^{th}$ region REGION 1-1 and a luminance of the (2-1)$^{th}$ region REGION 2-1 in each of the first step STEP 1 and the (2-2)$^{th}$ step STEP 2-2.

Referring to FIG. 13, a life time graph of the green sub-pixel according to the third combination CASE 3 may be obtained by measuring a luminance of the (1-3)$^{th}$ region REGION 1-3 and a luminance of the (2-3)$^{th}$ region REGION 2-3 in each of the first step STEP 1 and the (2-2)$^{th}$ step STEP 2-2.

Referring to FIG. 13, a life time graph of the green sub-pixel according to the fourth combination CASE 4 may be obtained by measuring a luminance of the (1-3)$^{th}$ region REGION 1-3 and a luminance of the (2-1)$^{th}$ region REGION 2-1 in each of the first step STEP 1 and the (2-2)$^{th}$ step STEP 2-2.

Accordingly, according to the method 1000 (see FIG. 10) in accordance with the embodiments of the present disclosure, the life time graph of the green sub-pixel (e.g., the graph shown in FIG. 8B) may be acquired.

FIG. 14 is a table illustrating a method for acquiring a life time graph of the blue sub-pixel by measuring luminances of the (1-1) region REGION 1-1, the (1-4) region REGION 1-4, the (2-1)$^{th}$ region REGION 2-1, and the (2-4)$^{th}$ region REGION 2-4.

Referring to FIG. 14, according to the method 1000 (see FIG. 10) in accordance with the embodiments of the present disclosure, a method capable of acquiring the four combinations shown in FIG. 9A is illustrated.

Referring to FIG. 14, a life time graph of the blue sub-pixel according to the first combination CASE 1 may be obtained by measuring a luminance of the (1-1)$^{th}$ region REGION 1-1 and a luminance of the (2-4)$^{th}$ region REGION 2-4 in each of the first step STEP 1 and the (2-3)$^{th}$ step STEP 2-3.

Referring to FIG. 14, a life time graph of the blue sub-pixel according to the second combination CASE 2 may be obtained by measuring a luminance of the (1-1)*t* h region REGION 1-1 and a luminance of the (2-1)$^{th}$ region REGION 2-1 in each of the first step STEP 1 and the (2-3)$^{th}$ step STEP 2-3.

Referring to FIG. 14, a life time graph of the blue sub-pixel according to the third combination CASE 3 may be obtained by measuring a luminance of the (1-4)$^{th}$ region REGION 1-4 and a luminance of the (2-4)$^{th}$ region REGION 2-4 in each of the first step STEP 1 and the (2-3)$^{th}$ step STEP 2-3.

Referring to FIG. 14, a life time graph of the blue sub-pixel according to the fourth combination CASE 4 may be obtained by measuring a luminance of the (1-4)$^{th}$ region REGION 1-4 and a luminance of the (2-1)$^{th}$ region REGION 2-1 in each of the first step STEP 1 and the (2-3)$^{th}$ step STEP 2-3.

Accordingly, according to the method 1000 (see FIG. 10) in accordance with the embodiments of the present disclosure, the life time graph of the blue sub-pixel (e.g., the graph shown in FIG. 9B) may be acquired.

In summary of FIGS. 10 to 14, in the method 1000 in accordance with the embodiments of the present disclosure, the life time of a sub-pixel for each color may be identified by considering influence of incident light.

Accordingly, information on the life time of the display panel 110 may be objectively identified within a short time.

In accordance with the present disclosure, there may be provided a display panel and a method of measuring a life time of the display panel, which may objectively identify the light emission efficiency of the display device.

In accordance with the present disclosure, there may be provided a display panel and a method of measuring a life time of the display panel, which may more objectively identify the light emission efficiency of the display device by considering a characteristic change of transistors constituting the display panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and or elements described in connection with a particular embodiment may be used singly or in combination with features, characteristics, and or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method of measuring a life time of a display panel, the display panel including a plurality of pixels each including a first sub-pixel emitting light of a first color, wherein the display panel includes a first region in which at least one pixel including the first sub-pixel emitting light of the first color is located and a second region not overlapping with the first region and having at least one pixel located therein, the method comprising:

a first step in which a first sub-pixel of a pixel located in the first region emits light and a first sub-pixel of a pixel located in the second region does not emit light while the first sub-pixel located in the first region emits light; and a second step in which a data voltage for displaying an image of the same grayscale is applied to the first sub-pixel located in the first region and the first sub-pixel located in the second region.

2. The method of claim 1, wherein each of the plurality of pixels further includes:

a second sub-pixel emitting light of a second color different from the first color; and a third sub-pixel emitting light of a third color different from the first color and the second color, and wherein the first region includes:

a white color emission region in which the first sub-pixel, the second sub-pixel, the third sub-pixel emit light during the first step;

a first color emission region in which the first sub-pixel emits light and the second sub-pixel and the third sub-pixel do not emit light during the first step;

a second color emission region in which the second sub-pixel emits light and the first sub-pixel and the third sub-pixel do not emit light during the first step; and a third color emission region in which the third sub-pixel emits light and the first sub-pixel and the second sub-pixel do not emit light during the first step.

3. The method of claim 2, wherein the second region includes:

a black grayscale display region in which the first sub-pixel, the second sub-pixel, and the third sub-pixel do not emit light during the first step;

a complementary color emission region of a first color in which the first sub-pixel does not emit light and the second sub-pixel and the third sub-pixel emit light during the first step;

a complementary color emission region of a second color in which the second sub-pixel does not emit light and the first sub-pixel and the second sub-pixel emit light during the first step; and a complementary color emission region of a third color in which the third sub-pixel does not emit light and the first sub-pixel and the second sub-pixel emit light during the first step.

4. The method of claim 3, wherein the second step includes a $(2\text{-}1)^{th}$ step in which a data voltage for displaying an image of the same grayscale is applied to the first sub-pixel located in the white color emission region and the first sub-pixel located in the black grayscale display region.

5. The method of claim 3, wherein the second step includes a $(2\text{-}2)^{th}$ step in which a data voltage for displaying an image of the same grayscale is applied to the second sub-pixel located in the white color emission region and the second sub-pixel located in the black grayscale display region.

6. The method of claim 3, wherein the second step includes a $(2\text{-}3)^{th}$ step in which a data voltage for displaying an image of the same grayscale is applied to the third sub-pixel located in the white color emission region and the third sub-pixel located in the black grayscale display region.

7. The method of claim 3, wherein, in the second step, a data voltage for displaying an image of the same grayscale is applied to a first sub-pixel located in the first color emission region and a first sub-pixel located in the complementary color emission region of the first color.

8. The method of claim 3, wherein, in the second step, a data voltage for displaying an image of the same grayscale is applied to a second sub-pixel located in the second color emission region and a second sub-pixel located in the complementary color emission region of the second color.

9. The method of claim 3, wherein, in the second step, a data voltage for displaying an image of the same grayscale is applied to a third sub-pixel located in the third color emission region and a third sub-pixel located in the complementary color emission region of the third color.

10. The method of claim 3, wherein each of the first sub-pixel, the second sub-pixel, and the third sub-pixel includes:

a light emitting element;

a first transistor configured to drive the light emitting element;

a second transistor controlled by a first scan signal, the second transistor being configured to transfer the data voltage to the first transistor; and a third transistor controlled by a second scan signal, the third transistor being configured to switch electrical connection between a drain node and a gate node of the first transistor.

11. The method of claim 10, wherein, during a period of the first step, a threshold voltage of the third transistor located in the white color emission region is negative-shifted, and a threshold voltage of the third transistor located in the black gray scale display region is negative-shifted.

12. The method of claim 11, wherein a degree to which the threshold voltage of the third transistor located in the white color emission area is negative-shifted is greater than a degree to which the threshold voltage of the third transistor located in the black gray scale display area.

13. The method of claim 10, wherein a substrate on which the first transistor, the second transistor, and the third transistor are formed is a polyimide substrate.

14. The method of claim 1, wherein the display panel includes an organic light emitting layer.

15. The method of claim 1, wherein the data voltage for displaying the image of the same grayscale applied to a first sub-pixel located in the first region and a first sub-pixel located in the second region in the second step is a data voltage for displaying a red image of grayscale 255, a data voltage for displaying a green image of grayscale 255, or a data voltage for displaying a blue image of grayscale 255.

16. A display panel comprising:

a substrate;

a plurality of data lines located on the substrate, the plurality of data lines supplying data voltages for image display;

a plurality of scan lines located on the substrate, the plurality of scan lines supplying scan signals; and a plurality of pixels located in a region in which the plurality of data lines and the plurality of scan lines intersect each other, the plurality of pixels disposed in predetermined regions receiving a predetermined data voltage during an aging process, wherein at least one pixel including a first sub-pixel emitting light of a first color is located in each of the predetermined regions, wherein, during a first step in the aging process, a data voltage for displaying an image of a grayscale greater than grayscale 0 is applied to a first sub-pixel located in a first region among the predetermined regions, and a data voltage for displaying an image of the grayscale 0 is applied to a first sub-pixel located in a second region different from the first region, and wherein, during a second step in the aging process, a data voltage for displaying an image of the same grayscale is applied to the first sub-pixel located in the first region and the first sub-pixel located in the second region.

17. The display panel of claim 16, wherein each of the plurality of pixels includes:

the first sub-pixel emitting light of the first color;

a second sub-pixel emitting light of a second color different from the first color; and a third sub-pixel emitting light of a third color different from the first color and the second color, and wherein the first region includes:

a white color emission region in which the first sub-pixel, the second sub-pixel, and the third sub-pixel emit light during the first step;

a first color emission region in which the first sub-pixel emits light and the second sub-pixel and the third sub-pixel do not emit light during the first step;

a second color emission region in which the second sub-pixel emits light and the first sub-pixel and the third sub-pixel do not emit light during the first step; and a third color emission region in which the third sub-pixel emits light and the first sub-pixel and the second sub-pixel do not emit light during the first step.

18. The display panel of claim 17, wherein the second region includes:

a low grayscale image display region in which a data voltage for displaying an image of a low grayscale level equal to or lower than a predetermined grayscale level is applied to the first sub-pixel, the second sub-pixel, and the third sub-pixel during the first step;

a complementary color emission region of a first color in which the first sub-pixel does not emit light and the second sub-pixel and the third sub-pixel emit light during the first step;

a complementary color emission region of a second color in which the second sub-pixel does not emit light and the first sub-pixel and the third sub-pixel emit light during the first step; and a complementary color emission region of a third color in which the third sub-pixel does not emit light and the first sub-pixel and the second sub-pixel emit light during the first step.

19. The display panel of claim 17, wherein each of the first sub-pixel, the second sub-pixel, and the third sub-pixel includes:

a light emitting element;

a first transistor configured to drive the light emitting element;

a second transistor controlled by a first scan signal, the second transistor being configured to switch electrical connection between at least one data line among the plurality of data lines and the first transistor; and a third transistor controlled by a second scan signal, the third transistor being configured to switch electrical connection between a drain node and a gate node of the first transistor.

20. The display panel of claim 16, wherein each of the plurality of pixels includes a light emitting element, and the light emitting element includes an organic light emitting layer.

* * * * *